(12) United States Patent
Liles et al.

(10) Patent No.: US 9,348,069 B2
(45) Date of Patent: May 24, 2016

(54) ARTICLE HAVING A PLURALITY OF OPTICAL STRUCTURES

(71) Applicant: NIKE, Inc., Beaverton, OR (US)

(72) Inventors: Timothy K. Liles, Portland, OR (US); Todd W. Miller, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 123 days.

(21) Appl. No.: 14/219,430

(22) Filed: Mar. 19, 2014

(65) Prior Publication Data

US 2015/0268393 A1    Sep. 24, 2015

(51) Int. Cl.
| | |
|---|---|
| *G02B 3/00* | (2006.01) |
| *G02B 5/22* | (2006.01) |
| *A43B 1/00* | (2006.01) |
| *G02B 1/12* | (2006.01) |
| *A41D 27/08* | (2006.01) |
| *A41D 31/00* | (2006.01) |
| *A43B 3/00* | (2006.01) |
| *B29D 11/00* | (2006.01) |
| *G02B 27/22* | (2006.01) |
| *A43B 23/02* | (2006.01) |

(52) U.S. Cl.
CPC *G02B 5/22* (2013.01); *A41D 27/08* (2013.01); *A41D 31/0088* (2013.01); *A41D 31/0094* (2013.01); *A43B 1/00* (2013.01); *A43B 1/0027* (2013.01); *A43B 1/0072* (2013.01); *A43B 3/0078* (2013.01); *A43B 23/0235* (2013.01); *B29D 11/0073* (2013.01); *B29D 11/00298* (2013.01); *G02B 1/12* (2013.01); *G02B 3/00* (2013.01); *G02B 27/2214* (2013.01)

(58) Field of Classification Search
CPC ...... G02B 3/00; G02B 3/0006; G02B 3/0012; G02B 3/0037; G02B 3/005; G02B 3/02; G02B 3/06; G02B 1/12; A43B 1/00
See application file for complete search history.

(56) References Cited

U.S. PATENT DOCUMENTS

| | | | |
|---|---|---|---|
| 4,712,314 A | 12/1987 | Sigoloff | |
| 4,944,572 A | 7/1990 | Young | |
| 5,896,230 A | 4/1999 | Goggins | |
| 6,856,462 B1 * | 2/2005 | Scarbrough | G02B 27/2214 359/619 |
| 7,230,764 B2 | 6/2007 | Mullen et al. | |
| 7,443,592 B2 | 10/2008 | Raymond et al. | |
| 7,683,926 B2 | 3/2010 | Schechterman et al. | |
| 7,965,961 B2 | 6/2011 | Priebe et al. | |

(Continued)

FOREIGN PATENT DOCUMENTS

| | | |
|---|---|---|
| EP | 0570806 | 11/1993 |
| GB | 2133273 | 7/1984 |

(Continued)

OTHER PUBLICATIONS

Notification of Transmittal of the International Search Report and Written Opinion mailed May 22, 2015 in International Patent Application No. PCT/US2015/019972.

*Primary Examiner* — Joseph P Martinez
(74) *Attorney, Agent, or Firm* — Plumsea Law Group, LLC

(57) ABSTRACT

An article having optical structures disposed on a base material element. Optical structures include lenticular lens structures and discrete coloring elements. Lenticular lens structure has several lens layers. The article has a different appearance when an observer views the article at various angles. The appearance may differ in terms of coloring scheme.

20 Claims, 20 Drawing Sheets

(56) References Cited

U.S. PATENT DOCUMENTS

| | | |
|---|---|---|
| 7,984,517 B2 | 7/2011 | Goodson |
| 8,035,897 B2 | 10/2011 | Spiro |
| 8,115,997 B1 | 2/2012 | Chien |
| 2006/0285215 A1 | 12/2006 | Wu |
| 2009/0115939 A1 | 5/2009 | Ikuta et al. |
| 2009/0202800 A1 | 8/2009 | Huang |
| 2010/0003472 A1 | 1/2010 | Lien |
| 2011/0116152 A1* | 5/2011 | Guigan ............ B29D 11/00365 359/242 |
| 2012/0019607 A1 | 1/2012 | Dunn et al. |
| 2012/0105928 A1 | 5/2012 | Camus et al. |
| 2012/0129096 A1 | 5/2012 | Miles |
| 2012/0274998 A1 | 11/2012 | Holmes et al. |
| 2013/0019506 A1* | 1/2013 | Shiao ................... A43B 1/0072 36/136 |
| 2013/0057608 A1 | 3/2013 | Yamamoto et al. |
| 2013/0094080 A1 | 4/2013 | Fujishiro et al. |

FOREIGN PATENT DOCUMENTS

| | | |
|---|---|---|
| GB | 2 299 537 A | 10/1996 |
| JP | 10-055149 A | 2/1998 |
| JP | 10-076690 A | 3/1998 |
| JP | 2001-005102 A | 1/2001 |
| JP | 2007-269022 A | 10/2007 |
| JP | 2011-002489 A | 1/2011 |
| WO | 2005/052650 | 6/2005 |
| WO | 2015/142587 A1 | 9/2015 |

* cited by examiner

ARTICLE HAVING A PLURALITY OF OPTICAL STRUCTURES

BACKGROUND

The present embodiments relate generally to articles of footwear and apparel, and in particular to articles of footwear and apparel capable of changing their appearance.

Articles, including articles of footwear and articles of clothing or apparel may include design elements or other kinds of structures that are intended to create a desired optical effect. The desired optical effects can include specific coloring, images and/or designs.

SUMMARY

In one aspect, an article configured to be worn by a user may include a base material element, and a plurality of optical structures. Each optical structure further includes a discrete coloring element and a lenticular lens structure. The discrete coloring element has a first side disposed against the base material element and a second side disposed opposite of the first side. Each discrete coloring element includes at least two regions having different colors. The lenticular lens structure has a plurality of lens layers. A bottom most lens layer of the lenticular lens structure is disposed against the second side of the discrete coloring element. The plurality of optical structures are spaced apart from one another, and the apparent color of the plurality of optical structures changes when the article is viewed from different angles.

In another aspect, an article has a base material element with at least one optical structure. The at least one optical structure has a discrete coloring element and a lenticular lens structure. The discrete coloring element has a circular shape, and further has a first side and a second side opposite the first side. The discrete coloring element has a plurality of colors. The lenticular lens structure has a plurality of lens layers where a bottom most lens layer of the lenticular lens structure is disposed against the second side of the discrete coloring element. Also, the lenticular lens structure is substantially transparent. The discrete coloring element is comprised of a first region, a second region, a third region and a fourth region. The first region has a first color, the second region has a second color, the third region has a third color and the fourth region has a fourth color. The first color, the second color, the third color and the fourth color are each different, and the apparent color of the discrete coloring element changes when the discrete coloring element is viewed from different angles through the lenticular lens structure.

In another aspect, a method of printing an optical structure onto a base material element of an article includes printing a discrete coloring element on the base material element; printing a bottom lens layer onto the discrete coloring element; curing the bottom lens layer by applying a radiation source set to a first intensity to the bottom lens layer; printing an intermediate lens layer; and curing the intermediate lens layer by applying a radiation source set to a second intensity to the bottom lens layer. The first intensity is different than the second intensity.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
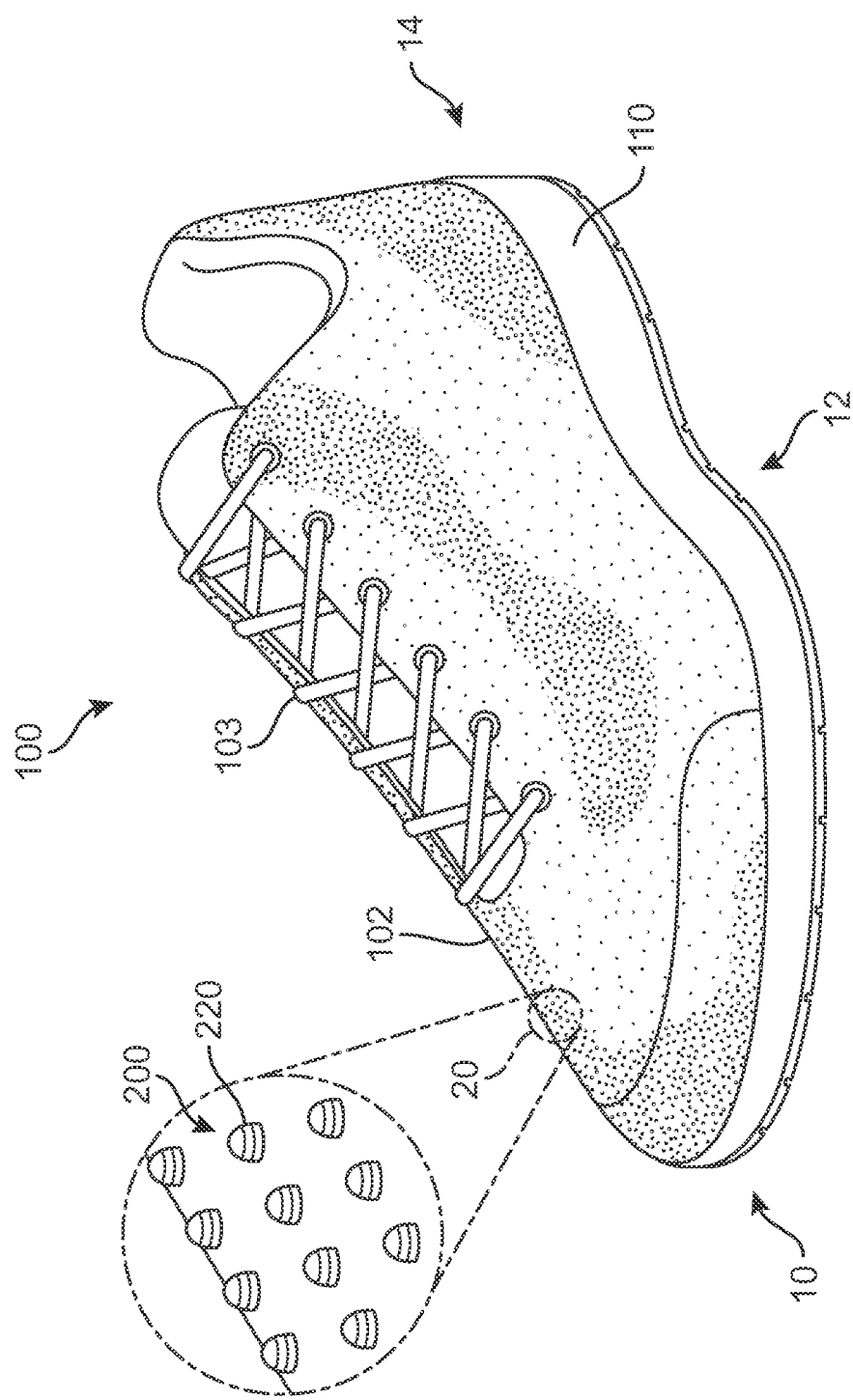
FIG. 1 is an isometric view of an embodiment of an article of footwear having several optical structures.

FIG. 1 illustrates an isometric view of an embodiment of an article of footwear 100, or simply article, having several optical structures 200 on the article of footwear 100. Although the embodiments throughout this detailed description depict articles configured as athletic articles of footwear, in other embodiments the articles may be configured as various other kinds of footwear including, but not limited to: hiking boots, soccer shoes, football shoes, sneakers, running shoes, cross-training shoes, rugby shoes, basketball shoes, baseball shoes as well as other kinds of shoes. Moreover, in some embodiments, articles may be configured as various kinds of non-sports related footwear, including, but not limited to: slippers, sandals, high heeled footwear, loafers as well as any other kinds of footwear.

Articles are generally made to fit various sizes of feet. In the embodiments shown, the various articles are configured with the same footwear size. In different embodiments, the articles could be configured with any footwear sizes, including any conventional sizes for footwear known in the art. In some embodiments, an article of footwear may be designed to fit the feet of a child. In other embodiments, an article of footwear may be designed to fit the feet of an adult. Still, in other embodiments, an article of footwear may be designed to fit the feet of a man or a woman.

In some embodiments, article of footwear 100 may include upper 102 and sole system 110. Generally, upper 102 may be any type of upper. In particular, upper 102 may have any design, shape, size and/or color. For example, in embodiments where article 100 is a basketball shoe, upper 102 could be a high top upper that is shaped to provide high support on an ankle. In embodiments where article 100 is a running shoe, upper 102 could be a low top upper. In some embodiments, upper 102 could further include provisions for fastening article 100 to a foot, such as a hook and look system (Velcro, for example) and may include still other provisions found in footwear uppers. In the embodiment shown in FIG. 1, a lacing system 103 is used for fastening article 100.

Sole system 110 is secured to upper 102 and extends between the foot and the ground when article 100 is worn. In different embodiments, sole system 110 may include different components. For example, sole system 110 may include an outsole, a midsole, and/or an insole. In some cases, one or more of these components may be optional.

Sole system 110 may provide one or more functions for article 100. For example, in some embodiments, sole system 110 may be configured to provide traction for article 100. In addition to providing traction, sole system 110 may attenuate ground reaction forces when compressed between the foot and the ground during walking, running or other ambulatory activities. The configuration of sole system 110 may vary significantly in different embodiments to include a variety of conventional or non-conventional structures. In some cases, the configuration of sole system 110 can be selected according to one or more types of ground surfaces on which sole system 110 may be used. Examples of ground surfaces include, but are not limited to: natural turf, synthetic turf, dirt, as well as other surfaces.

Referring to FIG. 1, for purposes of reference, upper 102 may be divided into forefoot portion 10, midfoot portion 12 and heel portion 14. Forefoot portion 10 may be generally associated with the toes and joints connecting the metatarsals with the phalanges. Midfoot portion 12 may be generally associated with the arch of a foot. Likewise, heel portion 14 may be generally associated with the heel of a foot, including the calcaneus bone. In addition, upper 102 may include lateral side 16 and medial side 18 (identified in FIGS. 21-22). In particular, lateral side 16 and medial side 18 may be opposing sides of article 100. Furthermore, both lateral side 16 and medial side 18 may extend through forefoot portion 10, midfoot portion 12 and heel portion 14. It will be understood that forefoot portion 10, midfoot portion 12 and heel portion 14 are only intended for purposes of description and are not intended to demarcate precise regions of upper 102. Likewise, lateral side 16 and medial side 18 (not shown) are intended to represent generally two sides of upper 102, rather than precisely demarcating upper 102 into two halves. As shown in FIG. 1, article of footwear is intended to be used with a left foot; however, it should be understood that the following description may equally apply to a mirror image of article of footwear that is intended for use with a right foot (not shown).

For consistency and convenience, directional adjectives are employed throughout this detailed description corresponding to the illustrated embodiments. The term "lateral direction" as used throughout this detailed description and in the claims refers to a direction extending along a width of a component. For example, the lateral direction of upper 102 may extend between medial side 18 and lateral side 16 of upper 102.

The term "multi-layered lens structure" is used throughout this detailed description and in the claims to refer to any structure comprised of two or more lenses. The lenses of a multi-layered lens structure may be layered or stacked. Furthermore, the term "lenticular lens structure" is used throughout the detailed description and in the claims to describe a multi-layered lens structure that is designed so that when viewed from different angles, different regions beneath the lenticular lens structure are magnified differently. For example in FIG. 3, a lenticular lens structure 220 is shown as comprising five distinct lenses, or lens layers.

In addition, the phrase "discrete coloring element" as used throughout this detailed description and in the claims refers to a two-dimensional or three-dimensional image having at least one color. In some embodiments, the discrete coloring element may be comprised of one or more colors including, but not limited to: red, green, purple, brown, black, blue, yellow, white, or a combination of thereof. Also, the phrase "optical structure" as used throughout this detailed description and in the claims refers to any multi-layered lens structure, for example a lenticular lens structure, in combination with a discrete coloring element, both of which will be described in further detail below. Specifically, in an optical structure, a discrete coloring element is partially or fully covered by a multi-layered lens structure, such as a lenticular lens.

As shown in FIG. 1, article 100 may be configured with a plurality of optical structures 200, which may be arranged on an exterior of upper 102. For purposes of illustration, a small region 20 of upper 102 is shown in an enlarged view within FIG. 1 so that several individual optical structures from the plurality of optical structures 200 may be clearly seen.

In some embodiments, plurality of optical structures 200 may be disposed on a majority, or even a substantial entirety, of the exterior surface of upper 102. In other embodiments, optical structures 200 may only be disposed on forefoot portion 10, midfoot portion 12, heel portion 14, as well as on lateral side 16, and/or medial side 18. Moreover, other embodiments may include optical structures 200 disposed in any combination of these portions and/or sides of article 100.

In different embodiments, the arrangement of optical structures, including both pattern and density, could vary. In some embodiments, such as the embodiment illustrated in FIG. 1, the plurality of optical structures 200 may be arranged such that optical structures 200 are spread approximately evenly over most portions of upper 102. In other words, in an exemplary embodiment, the density of optical structures over upper 102 may remain approximately constant. However, the spacing and density of optical structures could vary in other embodiments to achieve desired visual effects. For example, in another embodiment, the plurality of optical structures 200 could be configured into various kinds of patterns such as stripes, checkered patterns or other arrangements in which some regions of the pattern are associated with a higher density of optical structures. In still another embodiment, the density of optical structures could vary in a continuous and/or irregular manner over some portions of upper 102.

For purposes of illustration, the figures in this disclosure may show various regions of articles (such as an article of apparel or an article of footwear 100) with different shading. These differences in shading are intended to indicate differences in color and/or appearance of the regions. For example, one region of an article may have a darker shading (or denser stippling), than another region or regions to indicate a difference in color between the regions. Moreover, the color and/or appearance of articles may appear to change when an observer sees the articles from different viewing angles. Accordingly, the figures in this disclosure may show a change in shading in regions to reflect a change in color and/or appearance of the article when an observer views the article at different angles. This will be explained in further detail below.

Figure 2:
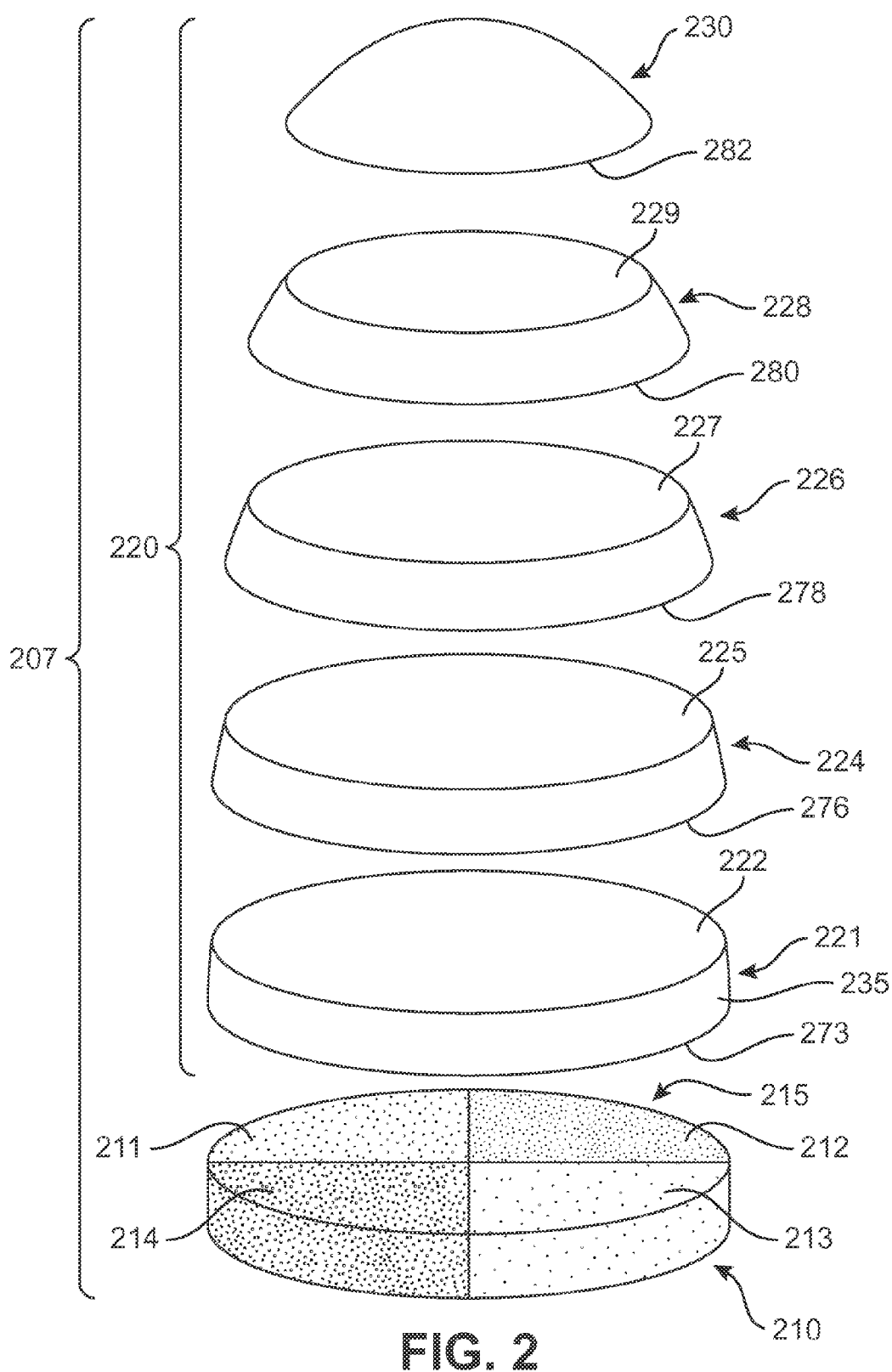
FIG. 2 is an exploded view of an embodiment of an optical structure.
Figure 3:
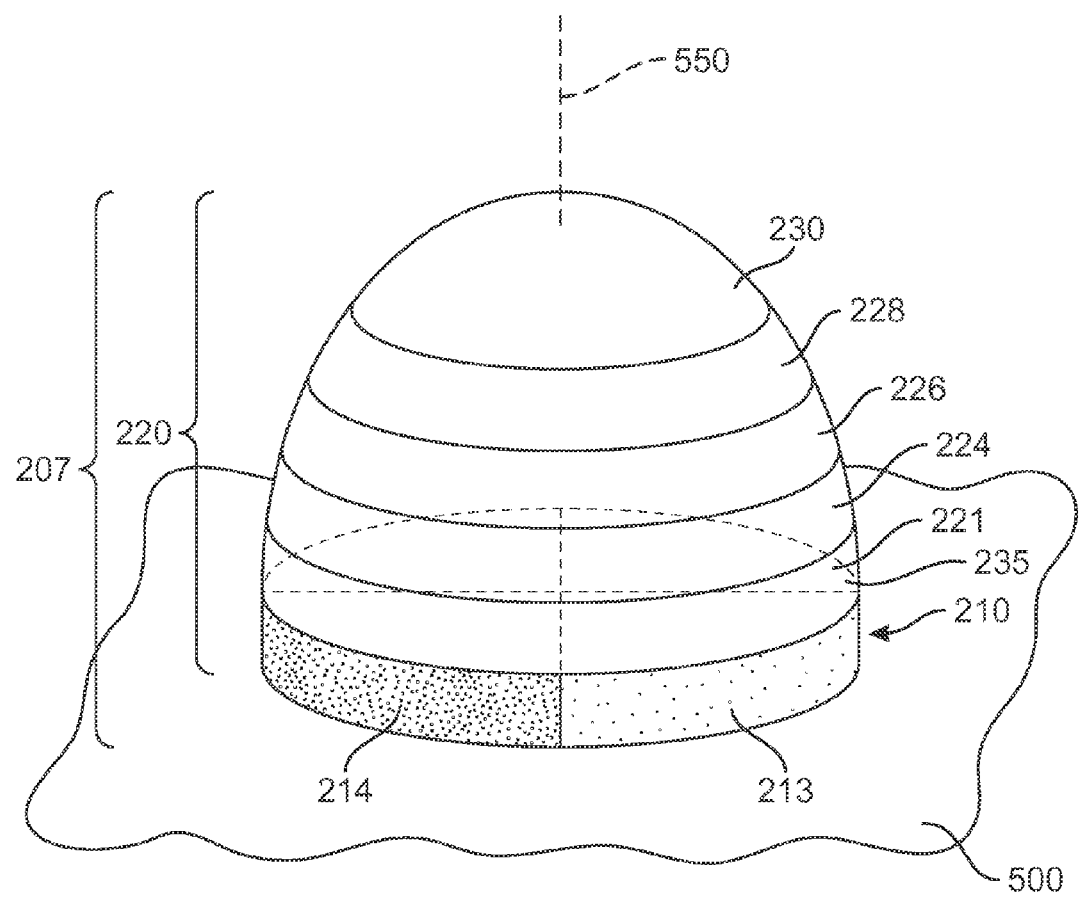
FIG. 3 is an embodiment of the optical structure shown in FIG. 2, with the lens layers connected together to form a lenticular lens structure disposed over a discrete coloring element.

FIGS. 2 and 3 illustrate an isometric view of an embodiment of an optical structure 207, which may be representative of plurality of optical structures 200. Optical structure 207 may be further comprised of a multi-layered lens structure. Specifically, optical structure 207 may be further comprised of a lenticular lens structure 220, as well as discrete coloring element 210. For purposes of illustration, lenticular lens structure 220 and discrete coloring element 210 are shown schematically, and therefore it should be understood that various dimensions of one or more components may not be drawn to scale. Thus, for example, the relative thicknesses of the lower most lens layer 221 of lenticular lens structure 220 and discrete coloring element 210 may differ substantially from the depicted embodiment.

Lenticular lens structure 220 may comprise any number of lenses. In the exemplary embodiments in FIGS. 2 and 3, lenticular lens structure 220 is comprised of five lenses (also referred to here as lens layers): a first lens layer 221, a second lens layer 224, a third lens layer 226, a fourth lens layer 228, and a fifth lens layer 230. However, it should be understood that lenticular lens structure 220 may include more than five lenses in other embodiments. In still other embodiments, lenticular lens structure 220 may include less than five lenses.

In different embodiments, lenticular lens structure 220 may configured as a variety of three-dimensional shapes, such as a parallelogram (having several rectangular surface areas), a cube (having several square surfaces), a semi-cylindrical shape, a semi-spherical shape, or a semi-ellipsoid shape. Accordingly, first lens layer 221, second lens layer 224, third lens layer 226, fourth lens layer 228, and fifth lens layer 230 are designed to achieve the desired shape for lenticular lens structure 220.

Referring to FIG. 2, first lens layer 221, second lens layer 224, third lens layer 226, and fourth lens layer 228 each have a top portion and bottom portion. For example, first lens layer 221 has first top portion 222 and first bottom portion 273. In some embodiments, any lens layer may include a top portion with a diameter and surface area substantially identical to bottom portion. In other embodiments, the dimensions of the top portion and the bottom portion could differ. In FIGS. 2 and 3, first top portion 222 has a diameter and surface smaller than the diameter of first bottom portion 273. Second lens layer 224 has second top portion 225 and second bottom portion 276, with second top portion 225 having a smaller diameter and surface area than second bottom portion 276. Similarly, third lens layer 226 has a third top portion 227 and third bottom portion 278, and fourth lens layer 228 has fourth top portion 229 and fourth bottom portion 280. Third top portion 227 has a smaller diameter and surface area than third bottom portion 278, and fourth top portion 229 has a smaller diameter and surface area than fourth bottom portion 280.

Generally, the shape and/or size of the upper most lens layer of a lenticular lens structure may vary according to the overall lenticular lens structure. In FIGS. 2 and 3, fifth lens layer 230, having fifth bottom portion 282, is convex in order to achieve an overall dome like shape of lenticular lens structure 220.

In some embodiments, successive lens layers of lenticular lens structure may be similar or larger, in terms of volume, diameter, and/or surface area. The phrase "successive lens layers" as used throughout this detailed description and in the claims refers to lens layers of a lenticular lens structure, beginning in order from the first lens layer (that is, the bottom most layer in contact with discrete coloring element) to the uppermost lens layer. In the embodiment in FIGS. 2 and 3, lenticular lens structure 220 has successively smaller lens layers. In other words, second bottom portion 276 and second top portion 225 are smaller in both diameter and surface area than first bottom portion 273 and first top portion 222, respectively; third bottom portion 278 and third top portion 227 are smaller in both diameter and surface area than second bottom portion 276 and second top portion 225, respectively; and, fourth bottom portion 280 and fourth top portion 229 are smaller in both diameter and surface area than third bottom portion 278 and third top portion 227, respectively.

In some embodiments, the dimensions of each lens layer can be selected so that portions of adjacent lens layers that are in contact with one another have similar dimensions. For example, first top portion 222 of first lens layer 221 may have a substantially similar diameter and/or surface area as second bottom portion 276 of second lens layer 224; second top portion 225 of second lens layer 224 may have a substantially similar diameter and/or surface area as third bottom portion 278 of third lens layer 226; third top portion 227 of third lens layer 226 may have a substantially similar diameter and/or surface area as fourth bottom portion 280 of fourth lens layer 228; and fourth top portion 229 of fourth lens layer 228 may have a substantially similar diameter and/or surface area as fifth bottom portion 282 of fifth lens layer 230.

The thickness of lens layers of the lenticular lens structure 220 may vary in order to achieve desired optical effects. In the exemplary embodiment in FIGS. 2 and 3, each lens layer may have a thickness approximately in the range between 0.001 mm and 5 mm. The thickness of each layer may be selected according to factors including desired optical effects (such as desired index of refraction), as well as manufacturing considerations (such as the type of material used to print or otherwise create each lens layer).

In some embodiments, one or more lenses may be partially or fully colored or tinted. However, in an exemplary embodiment each lens layer of lenticular lens structure 220 may be transparent or translucent so that discrete coloring element 210 may be observed through each lens layer of lenticular lens structure 220.

Discrete coloring element 210 may vary in shape, size and color. In the exemplary embodiment in FIGS. 2 and 3, the shape of discrete coloring element 210 is a circular (round) dot. However, in other embodiments, the shape of discrete coloring element 210 includes, but is not limited to, a square, rectangle, triangle, pentagon, or any enclosed shape having more than five sides. In still other embodiments, discrete coloring element 210 could have any regular or irregular shape.

In different embodiments, the thickness of discrete coloring element 210 may vary. For example, in some embodiments, the thickness of discrete coloring element 210 may vary approximately in the range between 0.001 mm and 5 mm. The thickness of discrete coloring element 210 may be selected according to various factors including the type of material used to print or otherwise create discrete coloring element 210, as well as possibly other factors.

Additionally, in some embodiments, the diameter of discrete coloring element 210 may vary. In some embodiments, the diameter could vary between 0.001 mm and 5 mm. In still other embodiments, the diameter could be greater than 5 mm. The diameter of discrete coloring element 210 could be selected according to various factors, including the printing technology used in cases where discrete coloring element 210 is printed, as well as desired design or pattern effects (e.g., desiring larger or smaller dots in the resultant design). Moreover, it should be understood that in embodiments where discrete coloring element 210 may not be round, the dimensions (such as length and width) could also vary in any manner.

In at least some embodiments, the diameter of discrete coloring element 210 may be selected according to the diameter of the nearest lens of lenticular lens structure 210, or vice versa. In the exemplary embodiment, first lens layer 221 is the lens layer nearest in proximity to discrete coloring element 210. Further, first bottom portion 273 of first lens layer 221 is generally the bottom portion nearest in proximity to discrete coloring element 210. In some embodiments, the diameter of discrete coloring element 210 is larger than diameter of first bottom portion 273. In other embodiments, the diameter of discrete coloring element 210 is smaller than the diameter of first bottom portion 273. In the exemplary embodiment as shown in FIGS. 2 and 3, the diameter of discrete coloring element 210 and first bottom portion 273 are approximately identical. This configuration provides a distinct optical effect whereby the colors of discrete coloring element 210 are magnified in different amounts according to the viewing angle of the observer.

Figure 4:
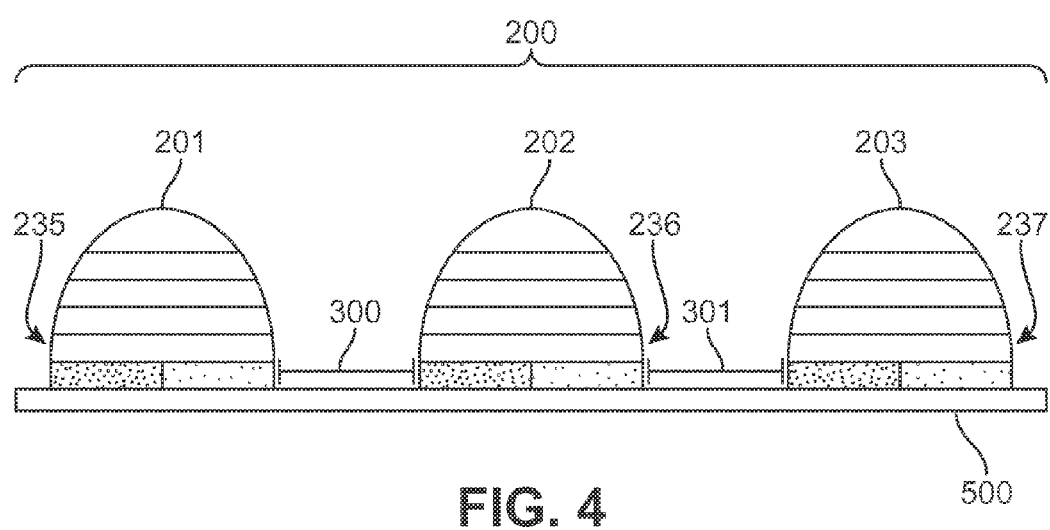
FIG. 4 is an embodiment of a base material element having several optical structures.

FIGS. 3 and 4 clearly illustrate how all portions of discrete coloring element 210 may be completely covered by first lens layer 221 of lenticular lens structure 220. Specifically, no portion of discrete coloring element 210 is disposed radially further from a central axis 550 of optical structure 220 than outer periphery 235 of first lens layer 221. For purposes of clarity, "outer periphery" as used throughout this detailed description and in the claims refers to the outermost perimeter of a bottom most lens layer that contacts a base material element. In other embodiments, at least some portions of discrete coloring element 210 could extend outside outer periphery 235 of lenticular lens structure 220 such that some portions of discrete coloring element 210 would not be covered by lenticular lens structure 220. Still, in other embodiments, all portions of discrete coloring elements 210 could lie well within outer periphery 235 of lenticular lens structure. In other words, the diameter of discrete coloring element 210 could be substantially less than the diameter of bottom portion 273 of first lens layer 221.

Optical structures 200 may vary in several ways in order to achieve desired optical effects. For example, discrete coloring element 210 could vary in diameter, thickness, and/or geometry in order to produce, for example, differences in color and/or appearance of discrete coloring element when observed through a lenticular lens structure. Additionally, any lens layer (or layers) of lenticular lens structure 220 could vary in diameter, thickness, and/or geometry in order to produce, for example, differences in color and/or appearance of a discrete coloring element when observed through lenticular lens structure.

Discrete coloring elements 210 may be divided into several regions. In FIGS. 2 and 3, discrete coloring element 210 is a circular dot divided into four regions. More specifically, discrete coloring element 210 is divided into four quadrants: first quadrant 211, second quadrant 212, third quadrant 213, and fourth quadrant 214. In the exemplary embodiment, first quadrant 211, second quadrant 212, third quadrant 213, and fourth quadrant 214 are substantially identical in surface area. However, in other embodiments, regions (including quadrants) may not be substantially identical.

In some embodiments, one or more quadrants of discrete coloring element 210 may be colored. The colors of discrete coloring element 210 may be of any combination. In some embodiments, the color may be the same for each region. In FIGS. 2 and 3, each quadrant is associated with a different color from the remaining quadrants.

Although the exemplary embodiment depicts a discrete coloring element 210 comprised of four regions of different colors, in other embodiments a discrete coloring element 210 could be comprised of any other number of regions. For example, in another embodiment, a discrete coloring element 210 could comprise just two regions of different colors. In still other embodiments, discrete coloring element 210 could comprise three, four, five or more than five distinct regions of different colors.

Referring to FIG. 2, discrete coloring element 210 has a top surface 215 displaying first quadrant 211, second quadrant 212, third quadrant 213, and fourth quadrant 214. Over top surface 215 of discrete coloring element 210 are the layers of lenticular lens structure 220. First lens layer 221 has a bottom surface (not shown) which contacts top surface of discrete coloring element. Second lens layer 224 has a bottom surface (not shown) which contacts top surface 222 of first lens layer 221. Remaining successive lens layers are stacked in a similar manner, that is, similar to first lens layer 221 and second lens layer 224, as shown in FIGS. 2 and 3. For lenticular lens structures having more than five lens layers, the stacking process is also similar. Generally, lenticular lens structure 220 is centered vertically over the center of discrete coloring element 210. In other embodiments, lenticular lens 220 may be offset from discrete coloring element 210.

As shown in FIGS. 3 and 4, optical structure 207 is placed on a base material element 500. Base material element 500 may be part of upper 102, or may be part of another article of apparel (discussed later). Base material element 500 could be made of, for example, fabric, cotton, wool, rubber, leather, synthetic materials, or a combination thereof. Base material element 500 could also be made from knitted or woven material. Multiple optical structures 200 may be placed on base material element 500, as shown in FIG. 4.

FIG. 4 illustrates a plurality of optical structures 200 spaced apart from one another. In some embodiments, adjacent or neighboring optical structures may overlap each other, in which case there is no spacing between adjacent optical structures. In other embodiments, adjacent optical structures may contact each other only at their respective outer peripheries. In FIG. 4, first outer periphery 235 of first optical structure 201 is spaced apart from second outer periphery 236 of second optical structure 202 (adjacent to first optical structure 201) at first distance 300. Further, second outer periphery 236 of second optical structure 202 is spaced apart from third outer periphery 237 of third optical structure 203 (adjacent to second optical structure 202) at second distance 301. In exemplary embodiment in FIG. 4, first distance 300 is approximately equal to second distance 301. In other embodiments, adjacent optical structures may not be evenly spaced apart. In other words, the first distance may not be equal to the second distance. In still other embodiments, adjacent optical structures may be approximately evenly spaced apart in some regions of base material element 500 and not evenly spaced apart in another region or regions.

Figure 5:
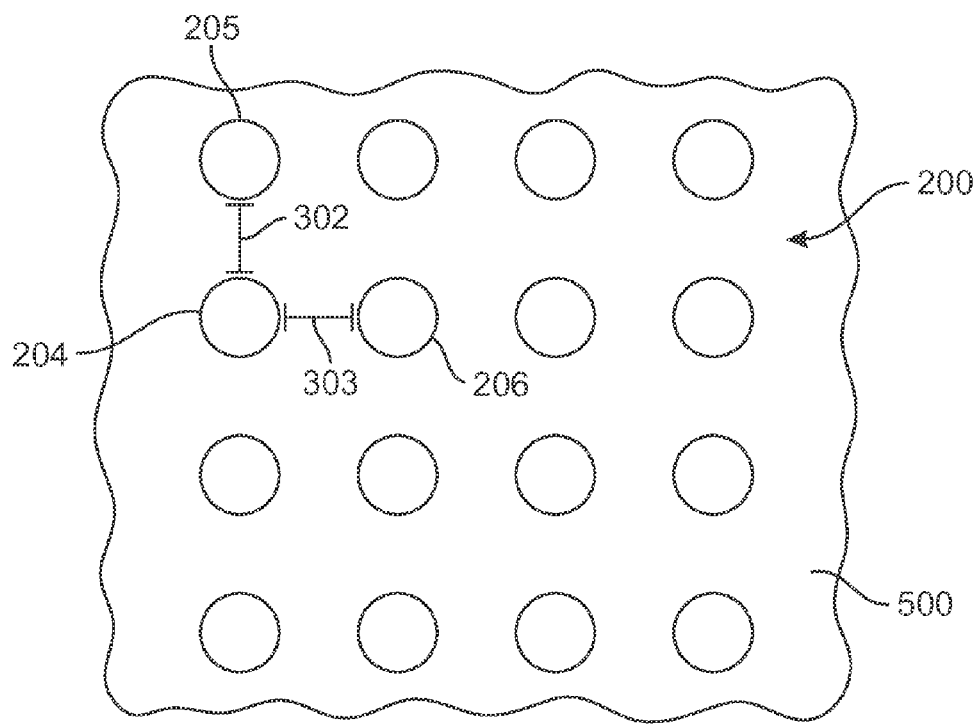
FIG. 5 is an embodiment of a base material element having columns and rows of optical structures.

FIG. 5 illustrates a schematic top down view of a section of base material element 500, including a plurality of optical structures 200. In the configuration shown in FIG. 5, plurality of optical structures 200 may be arranged into columns and rows. In this exemplary configuration, first optical structure 204 is separated by a spacing 302 from a second optical structure 205. Here, first optical structure 204 and second optical structure 205 are seen to belong to different rows. Additionally, first optical structure 204 is seen to be separated from a third optical structure 206 by a spacing 303. Here, third optical structure 206 is seen to belong to an adjacent column to first optical structure 204. In some embodiments, spacing 302 may be substantially equal to spacing 303. In other embodiments, spacing 302 may not be substantially equal spacing 303. In still other embodiments, spacing 302 may be substantially equal to spacing 303 in some regions on base material element 500, and spacing 302 may not be substantially equal spacing 303 in another region or region of base material element 500. Thus, it is clear from FIGS. 4 and 5 that each optical structure may be generally spaced apart from all adjacent optical structures.

Figure 6:
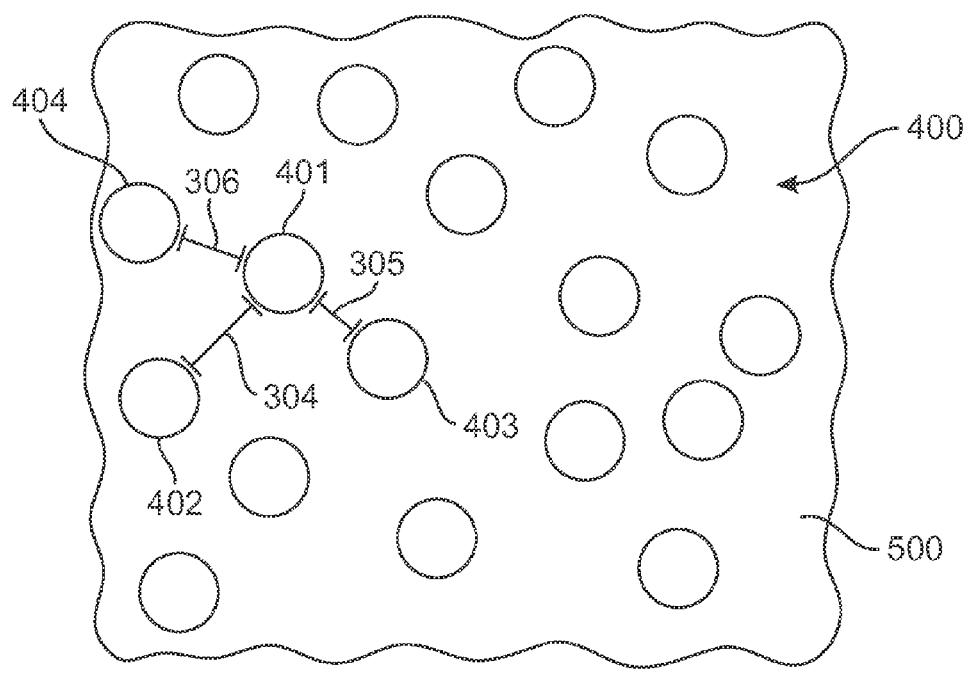
FIG. 6 is an embodiment of a base material element having optical structures, wherein the optical structures are not in distinct columns and/or rows.

In an alternative configuration, shown in FIG. 6, base material element 500 includes a plurality of optical structures 400. In contrast to the configuration shown in FIG. 5, optical structures 400 may not be arranged in a regular pattern. In such a configuration, each optical structure may still be spaced apart from any neighboring or adjacent optical structures. For example, a first optical structure 401 may be spaced apart from a second optical structure 402 by a spacing 304. First optical structure 401 may also be spaced apart from a third optical structure 403 by a spacing 305. First optical structure 401 may also be spaced apart from a fourth optical structure 404 by a spacing 306. While second optical structure 402, third optical structure 403, and fourth optical structure 404 may be considered adjacent to first optical structure 401, spacing 304, spacing 305, and spacing 306 may not be substantially equal. In other words, the plurality of optical structures 400 may not have consistent spacing between neighboring or adjacent optical structures.

The spacing of optical structures on the surface of an article as described and shown in the embodiments provides a unique visual effect whereby the appearance of each discrete coloring element is modified by a corresponding lenticular lens structure. In other words, each discrete coloring element, separated from its neighbors, is in one-to-one correspondence with an associated lenticular lens structure. This may be seen to be in contrast from some alternative lenticular designs, wherein multiple lenticular lenses are laid down over a single coloring element or other image. Thus, the exemplary configuration shown in the figures may provide for increased versatility in the patterns and/or designs that may be achieved along the surface of an article, since each discrete coloring element can be modified uniquely by a corresponding lenticular lens structure.

Figure 7:
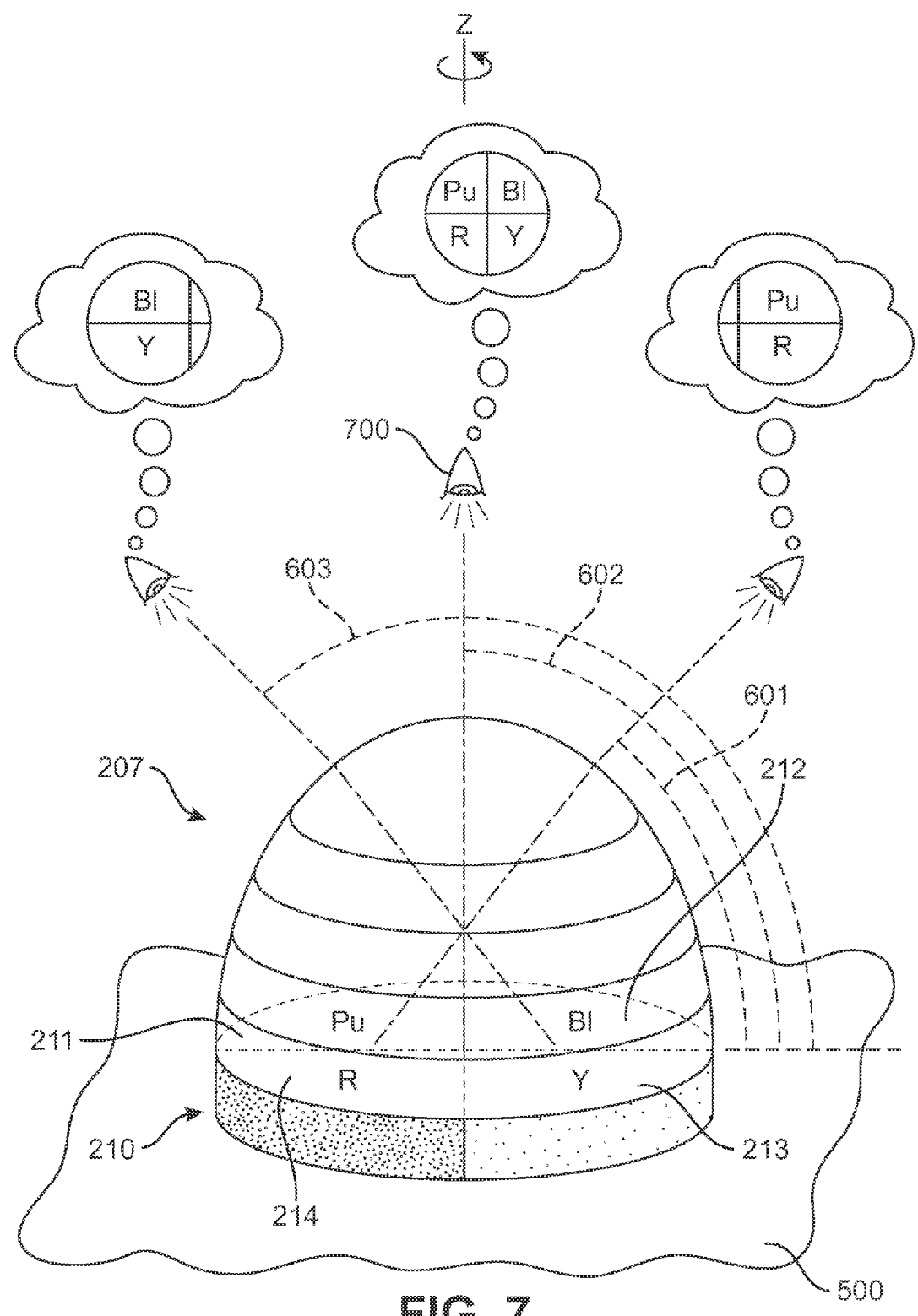
FIGS. 7-9 illustrate an observer viewing an optical structure from several distinct viewpoints, according to an embodiment.
Figure 8:
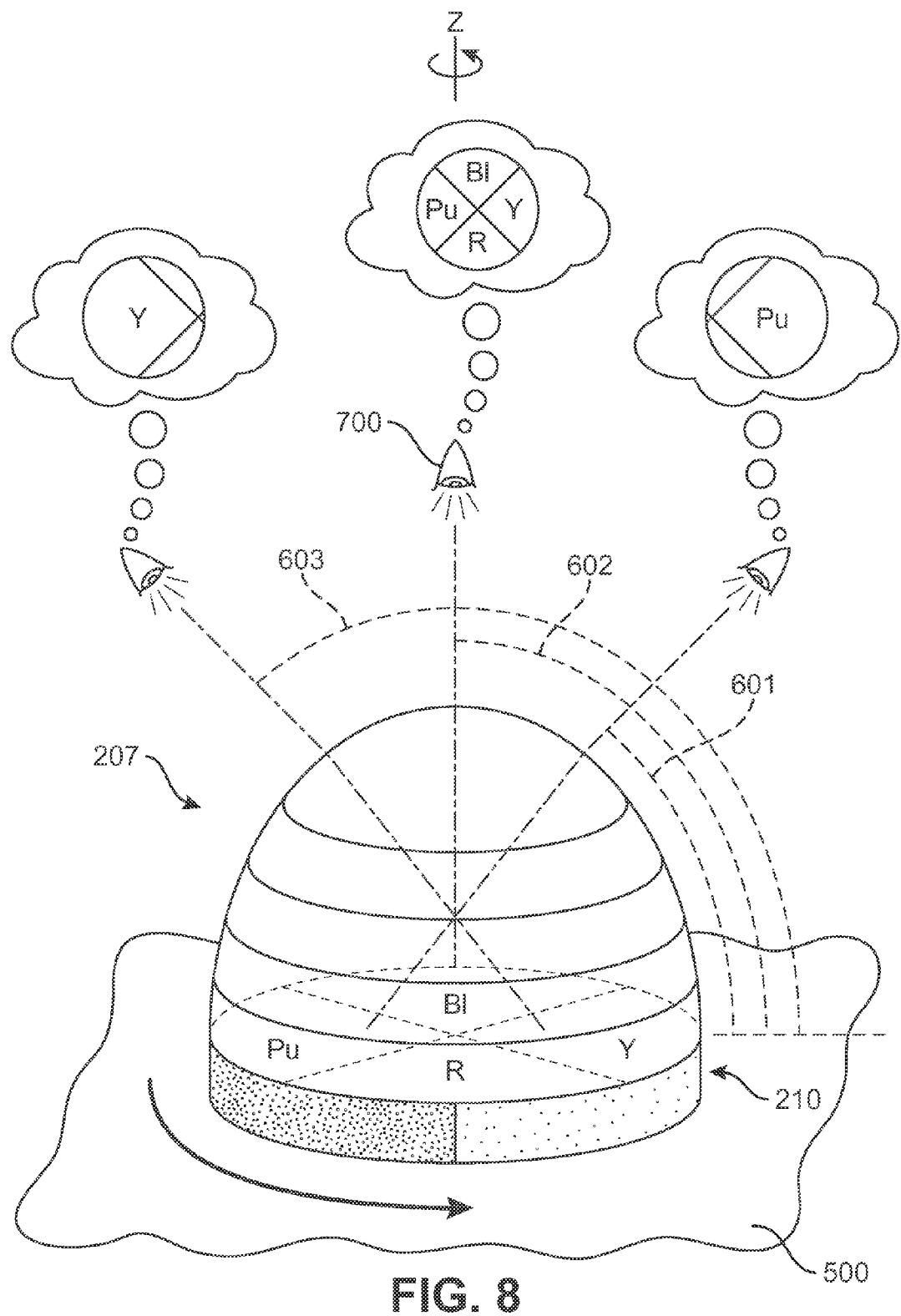
Figure 9:
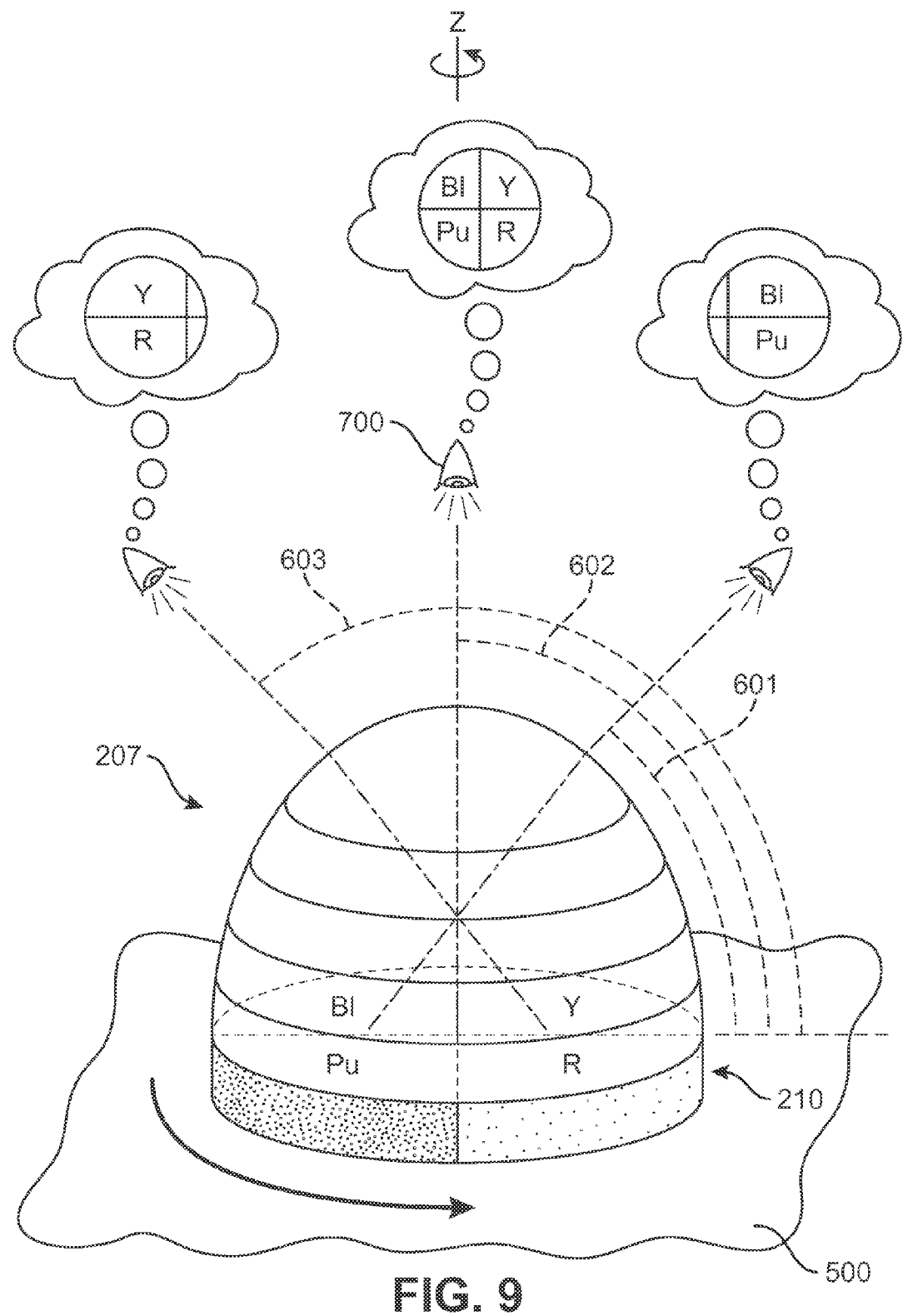

FIGS. 7-9 illustrate an observer 700 viewing the optical structure 207 at different viewing angles. In the exemplary embodiments of FIGS. 7-9, discrete coloring element 210 has four quadrants. First quadrant 211 is purple (Pu), second quadrant 212 is blue (Bl), third quadrant 213 is yellow (Y), and fourth quadrant 214 is red (R). In an exemplary embodiment, first quadrant 211, second quadrant 212, third quadrant 213, and fourth quadrant 214 may generally have the same surface area. Accordingly, the colors displaced on the quadrants are generally visible in similar proportions when the lenticular lens structure 220 is not present. However, with lenticular lens structure 220 placed over discrete coloring element 210, the appearance of discrete coloring element 210 may change when observer views discrete coloring element 210 through the lenticular lens structure 220 at various angles. For example, red may appear more visible than purple when viewing the optical structure 207 from an angle. In another example, blue and purple may appear more visible than red and yellow when viewing optical structure 207 from another angle.

Referring to FIG. 7, observer 700 is viewing optical structure from a first viewing angle 601 and sees primarily the colors red and purple from discrete coloring element 210. When the observer views optical structure 207 from a second viewing angle 602, all four colors from discrete coloring element 210 are seen generally in similar proportions. When the observer views optical structure 207 from a third viewing angle 603, the colors yellow and blue from discrete coloring element 210 are primarily seen.

FIG. 8 is the embodiment of optical structure in FIG. 8, with optical structure 207 rotated radially about the z-axis. Now, observer 700 viewing optical structure 207 from first viewing angle 601 sees primarily the color purple from discrete coloring element 210. When observer 700 views optical structure 207 from a second viewing angle 602, all four colors from discrete coloring element 210 are seen generally in similar proportions. When observer 700 views optical structure 207 from third viewing angle 603, the color yellow from discrete coloring element 210 is primarily seen.

FIG. 9 is the embodiment of the optical structure 207 in FIG. 8, with optical structure 207 further rotated by about the z-axis. Now, observer 700 viewing optical structure 207 from first viewing angle 601 sees primarily the colors blue and purple from discrete coloring element 210. When observer 700 views optical structure 207 from a second viewing angle 602, all four colors from discrete coloring element 210 are seen generally in similar proportions. When observer 700 viewing optical structure 207 from third viewing angle 603, the colors yellow and red from discrete coloring element 210 are primarily seen.

It will be understood that FIGS. 7-9 are only intended for purposes of illustration and are not intended to demarcate precise color schemes viewed at precise viewing angles. Observer 700 could view one of many color combinations when optical structure 207 is rotated about the z-axis and/or when observer 700 views the optical structure 207 at different viewing angles. Similarly, several color combinations in several other proportions not shown could also be viewed depending on the rotation of optical structure 207 about the z-axis and/or the viewing angle of the observer 700.

Figure 11:
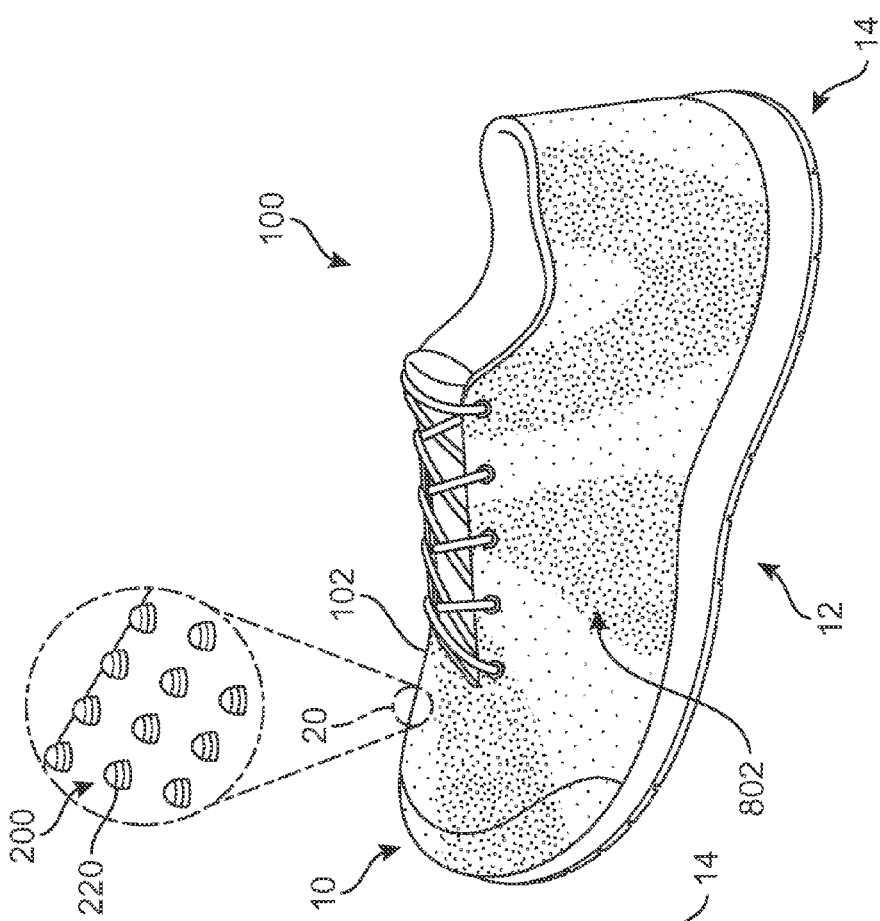
FIGS. 10 and 11 are isometric views of an article of footwear shown at different viewing angles, according to an embodiment.
Figure 10:
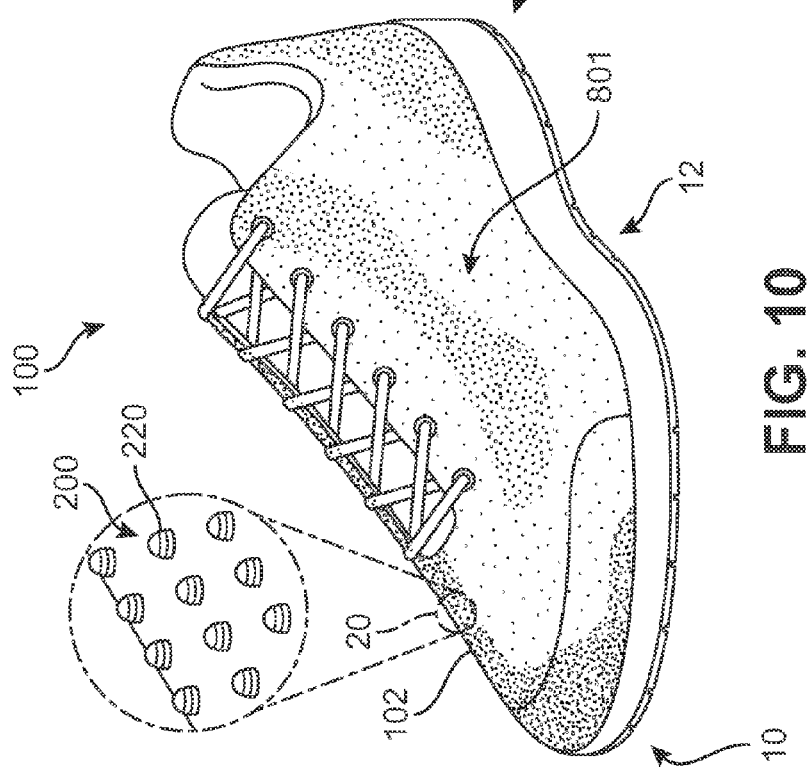

FIGS. 10 and 11 illustrate an embodiment of an article of footwear 100 shown at two different viewpoints. Article of footwear 100 includes a plurality of optical structures 200 on forefoot 10, midfoot 12, and heel portion 14 of upper 102. Optical structures 200 on upper 102 may be, for example, an embodiment shown in FIG. 3. Article 100 may appear to change when article is viewed at different viewpoints. For example in FIG. 10, when article 100 is arranged for viewing with forefoot 10 in the foreground, upper 102 has a first appearance 801. In FIG. 11, when article 100 is rotated such that heel portion 14 is in the foreground, upper 102 has a second appearance 802 different from the first appearance 801.

It will be understood that article 100 could have several different appearances from several different viewpoints. For example, upper 102 viewed from a particular viewpoint may appear to be completely red. From another viewpoint, upper 102 may appear to be any combination of, for example, red, yellow, blue, and/or purple. As shown in FIGS. 10 and 11 article of footwear is intended to be used with a left foot; however, it should be understood that the following description may equally apply to a mirror image of article of footwear 100 that is intended for use with a right foot (not shown).

Figure 12:
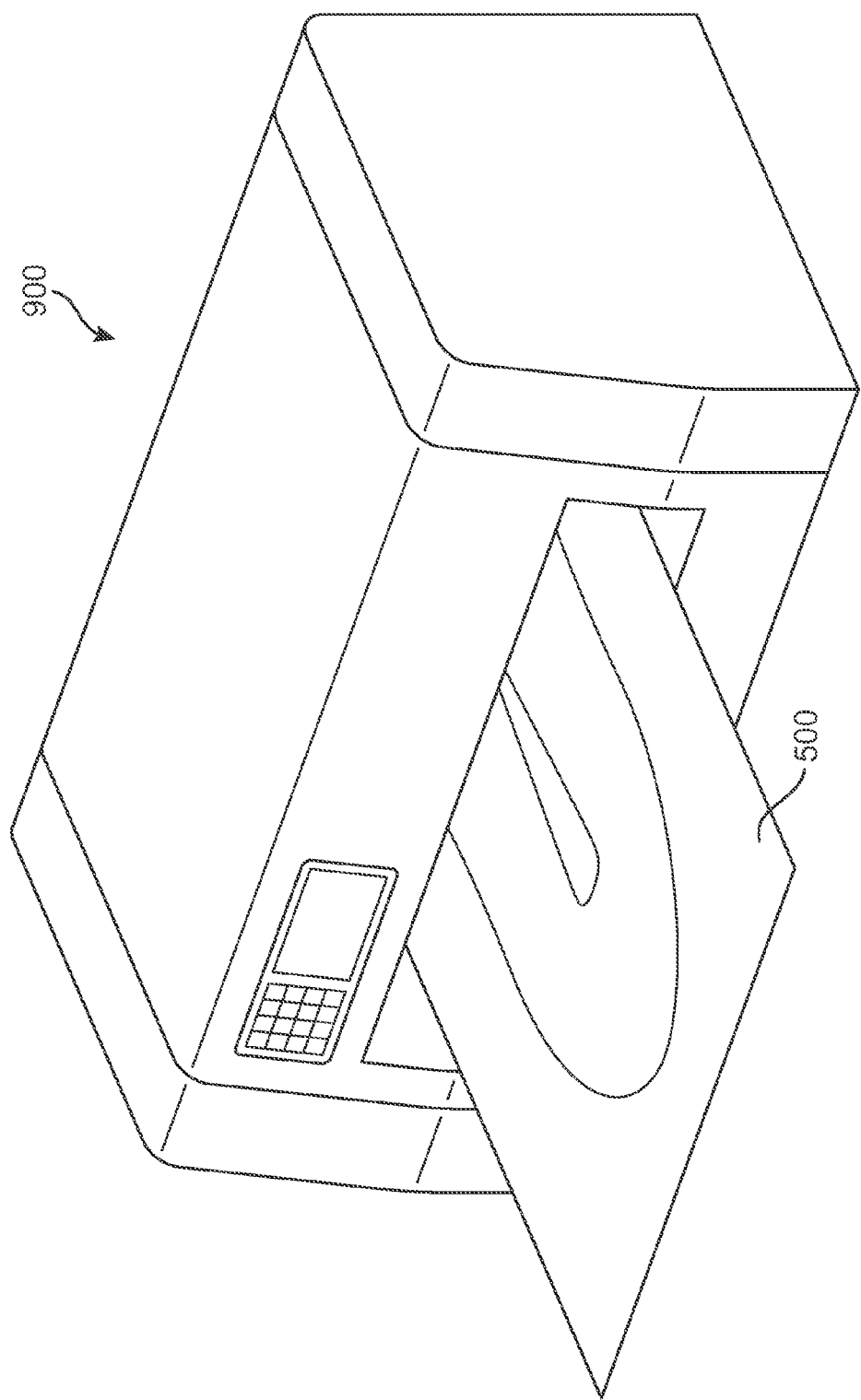
FIGS. 12 and 13 are isometric views of an embodiment of a printing apparatus used to print a discrete coloring element and lens layers of lenticular lens structure onto a base material element.

FIGS. 12-18 illustrate an exemplary process of disposing optical structures 200 on a base material element 500 in order to form an article (e.g. an article of footwear 100 or an article of apparel, shown later) with optical structures 200 on an exterior surface. Printing apparatus 900, shown in FIG. 12, is capable of printing discrete coloring elements 210 onto base material element 500 as well as printing successive lens layers of the lenticular lens structure 220. Printing apparatus 900 has a cable (not shown) connected to a power source (not shown) in order to provide power to printing apparatus 900. It will be understood that "printing successive lens layers" is intended to describe the printing apparatus 900 printing a successive lens layer over the prior lens layer.

The embodiments described throughout this detailed description have a first lens layer 221 with bottom surface having a diameter and/or surface area substantially identical to that of top surface 215 of discrete coloring element 210. Alternatively, in some other embodiments, first lens layer 221 has a bottom surface having diameter and surface area greater than that of top surface 215 of discrete coloring element 210, in which case printing apparatus 900 prints first lens layer 221 onto both discrete coloring element 210 and base material element 500. In still other embodiments, first lens layer 221 has a bottom surface having a diameter and surface area less than that of top surface 215 of discrete coloring element 210, in which case printing apparatus 900 prints first lens layer 221 onto only discrete coloring element 210.

In different embodiments, various printing techniques could be used to apply a coloring layer and/or lens layers to base material element 500. These printing techniques can include, but are not limited to: toner-based printing, liquid inkjet printing, solid ink printing, dye-sublimation printing, inkless printing (including thermal printing and UV printing), MEMS jet printing technologies as well as any other methods of printing. In some cases, printing apparatus 510 may make use of a combination of two or more different printing techniques. The type of printing technique used may vary according to factors including, but not limited to: material of the target article, size and/or geometry of the target article, desired properties of the printed image (such as durability, color, ink density, etc.) as well as printing speed, printing costs and maintenance requirements.

Figure 13:
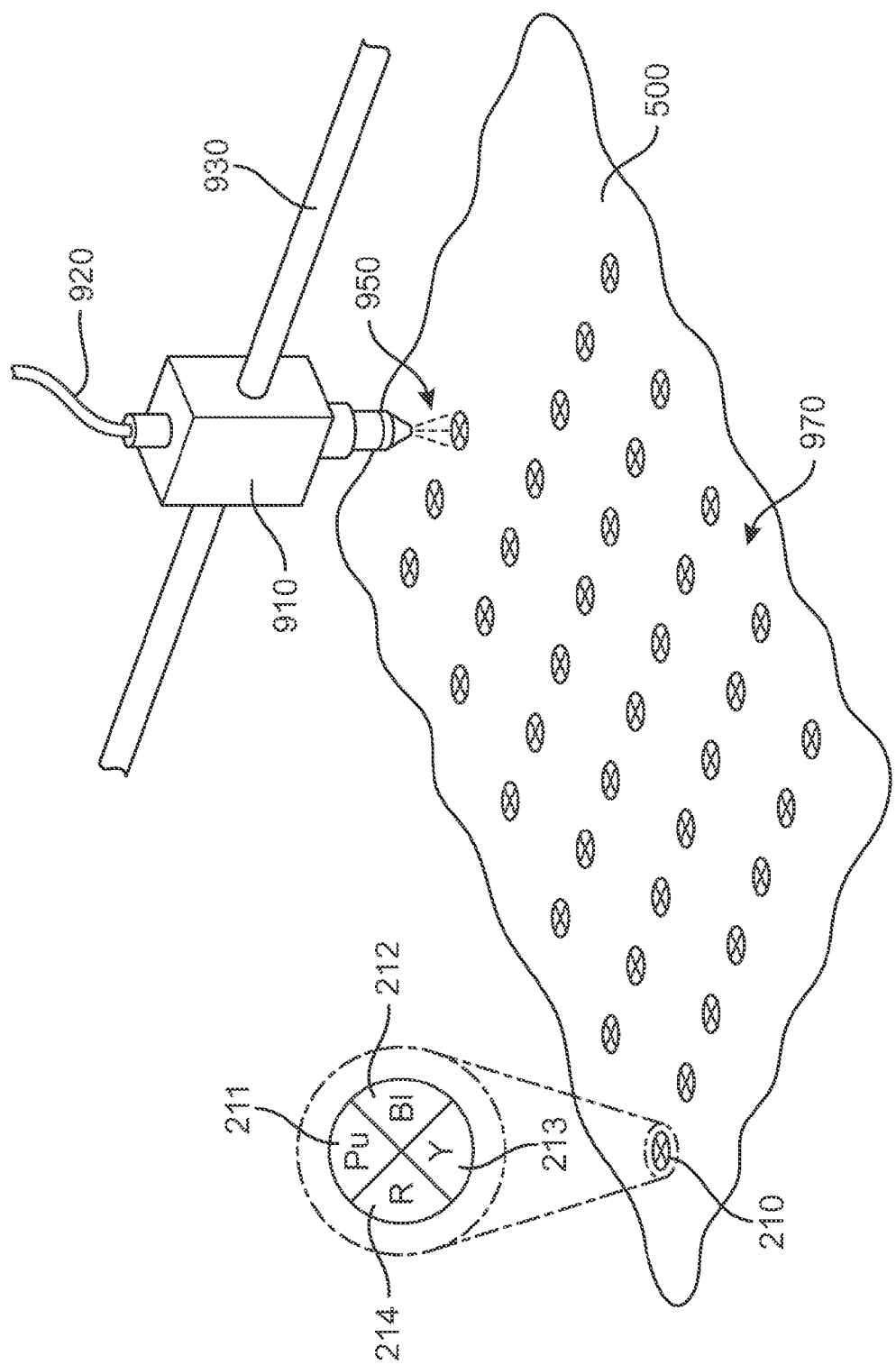

Referring to FIGS. 12 and 13, base material element 500 may be fed through printing apparatus 900. FIG. 13 illustrates print head 910 of printing apparatus 900 dispersing ink toner 950 to form a plurality of discrete coloring elements 970, also referred to simply as discrete coloring elements 970, onto base material element 500. As shown in FIG. 13, a cable 920 feeds ink toner 950 from printing apparatus 900 to print head 910. Print head 910 is connected to a rod element 930 capable of moving print head 910.

In FIG. 13, discrete coloring elements 970 are spaced evenly apart from each other throughout base material element 500 to form several rows and columns of discrete coloring elements 970. In other embodiments, print head 910 may print discrete coloring elements 970 that are not evenly spaced apart. FIG. 13 shows discrete coloring element 210 having four regions, or quadrants, with first quadrant 211 being purple (Pu), second quadrant 212 being blue (Bl), third quadrant 213 being yellow (Y), and fourth quadrant 214 being red (R). It will be understood that discrete coloring element 210 may have at least one of several colors, and the colors may be printed in various proportions. For example, in some embodiments, one half of discrete coloring element 210 may be colored in purple, one quarter of discrete coloring element 210 may be colored in red, and remaining quarter of discrete coloring element 210 may be colored in yellow. In an exemplary embodiment, each of the remaining discrete coloring elements 970 may have a similar coloring configuration to discrete coloring element 210.

For purposes of illustration, discrete coloring elements 970 are shown schematically, and in particular are substantially larger and further spaced apart than they may be in some embodiments. In other words, discrete coloring elements 970 shown in FIG. 13 are not necessarily shown to scale in terms of size/diameter of discrete coloring elements 970 and spacing between adjacent of discrete coloring elements 970.

Figure 14:
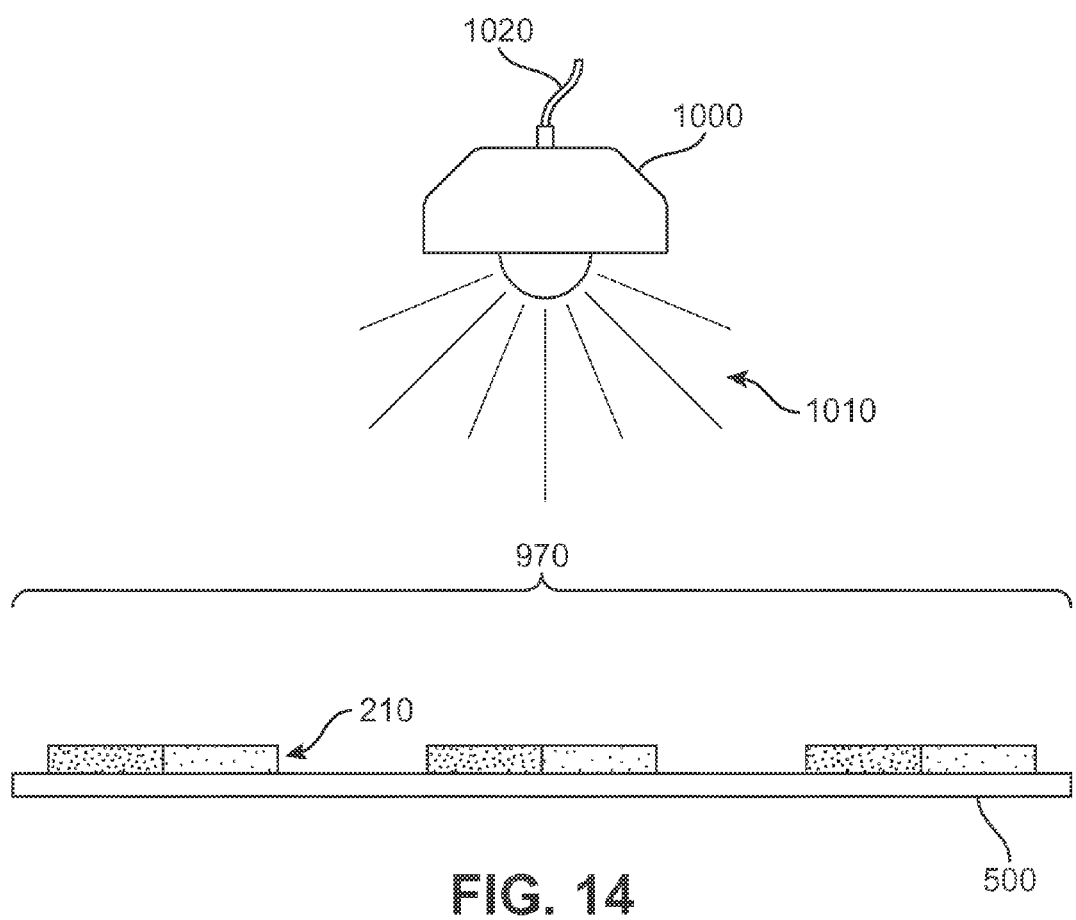
FIG. 14 is an embodiment of radiation source curing a discrete coloring element at a given radiation intensity.

FIG. 14 illustrates a radiation source 1000 capable of emitting radiation 1010 to discrete coloring elements 970. Radiation source 1000 has a cable 1020 connected to a power source (not shown) in order to provide power to radiation source 1000. Radiation source 1000 could be a light (for example, from a light bulb) or a heat lamp. Radiation source 1000 may provide any kind of electromagnetic radiation, including ultraviolet (UV) radiation. Radiation source 1000 is also capable of emitting radiation 1010 to each lens layer of a lenticular lens structure (shown later).

After print head 910 prints discrete coloring elements 970, radiation 1010 from radiation source 1000 is used to cure discrete coloring elements 970. The term "cure" or "curing" as used throughout this detailed description and in the claims refers to a process of treating and/or drying. Curing the discrete coloring elements 970 and/or the lens layers of the optical structures 200 may contribute to shaping optical structures 200 to achieve a desired shape. Both discrete coloring elements 970 and all lens layers of optical structures 200 may be cured by radiation 1010 from radiation source 1000. Curing time for discrete coloring element 970 and the corresponding lens layers may vary, but generally lasts approximately in the range between 0.1 seconds and 1 minute, in order to achieve desired visual effects.

Radiation source 1000 is capable of emitting radiation 1010 at various intensities. For purposes of characterizing a range of possible radiation intensities for radiation source 1000, reference is made to intensities as a percentage of a maximum radiation intensity that can be emitted by radiation source 1000. Thus, the possible intensities are described as ranging from 0% intensity (no radiation) to 100% intensity (maximum intensity). Here, the term maximum intensity may refer to either the maximum intensity achievable by the selected radiation source, or to a maximum desired intensity to achieve a particular curing effect. Thus, in some cases, the maximum intensity may not be the highest radiation setting of the selected radiation source. Accordingly, curing of discrete coloring elements 970 and the corresponding lens layers of optical structures 200 may be cured from radiation ranging from 0% intensity to 100% intensity.

Curing individual lens layers of each lenticular lens structure at a different intensity (relative to other lens layers) may cause differences in the resulting index of refraction of each layer. For example, optical structure 207 having first lens layer 221 cured at 5% intensity may have an index of refraction different from third lens layer 226 cured at 100% intensity. This curing technique may contribute to light rays propagating through first lens layer 221 in a different manner (such as a different angle) than through third lens layer 226. Further, this curing technique may also contribute to discrete coloring element 210 appearing different when viewing through lenticular lens structure 220 at different angles.

In some embodiments, radiation source 1000 is connected to printing apparatus 900, for example, via the print head 910 such that radiation source 1000 may be integrated within printing apparatus 900. In other embodiments, radiation source 1000 may be separate from, or external to, printing apparatus 900. In some embodiments, radiation source 1000 may be stationary. In other embodiments, radiation source 1000 may be configured to traverse in several directions such that radiation 1010 from radiation source 1000 may be emitted anywhere over base material element 500. Regardless of whether radiation source 1000 is stationary or capable of moving, radiation 1010 from radiation source 1000 may be delivered to any portion of base material element 500 with intensity ranging from 0% to 100%. In the exemplary embodiment shown in FIG. 14, radiation 1010 is emitted at 100% intensity to cure discrete coloring element 210.

After printing apparatus 900 prints several discrete coloring elements 970 onto base material element 500, radiation source 1000 may cure discrete coloring elements 970 either individually or cure several discrete coloring elements 970 simultaneously. In some methods of printing and curing, radiation source 1000 may cure all discrete coloring elements 970 simultaneously before printing apparatus 900 begins printing any lens layers over discrete coloring elements 970. In other methods of printing and curing, printing apparatus 900 may begin printing lens layers over some discrete coloring elements 970 that have been cured before radiation source 1000 cures the remaining (uncured) discrete coloring elements 970.

Figure 15:
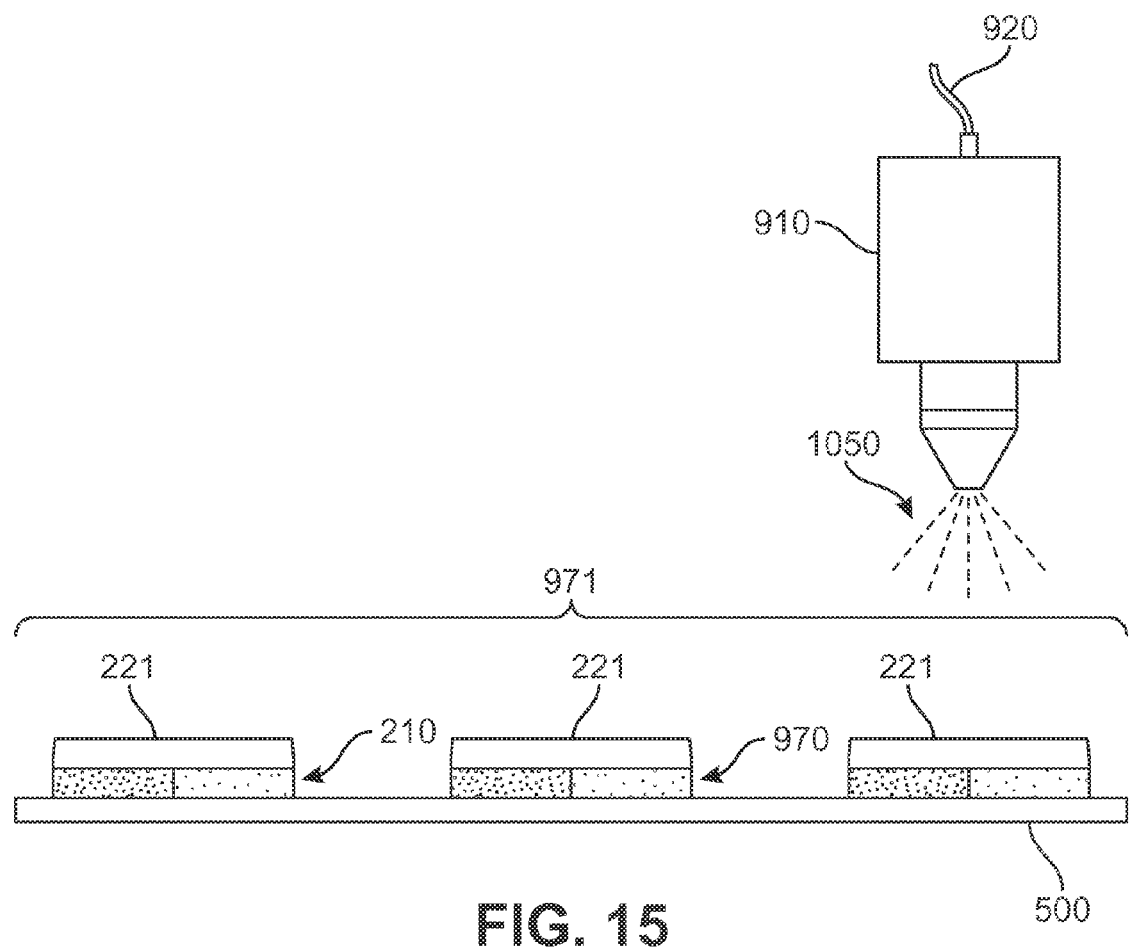
FIG. 15 illustrates a print head printing a first lens layer onto a discrete coloring element, according to an embodiment.
Figure 16:
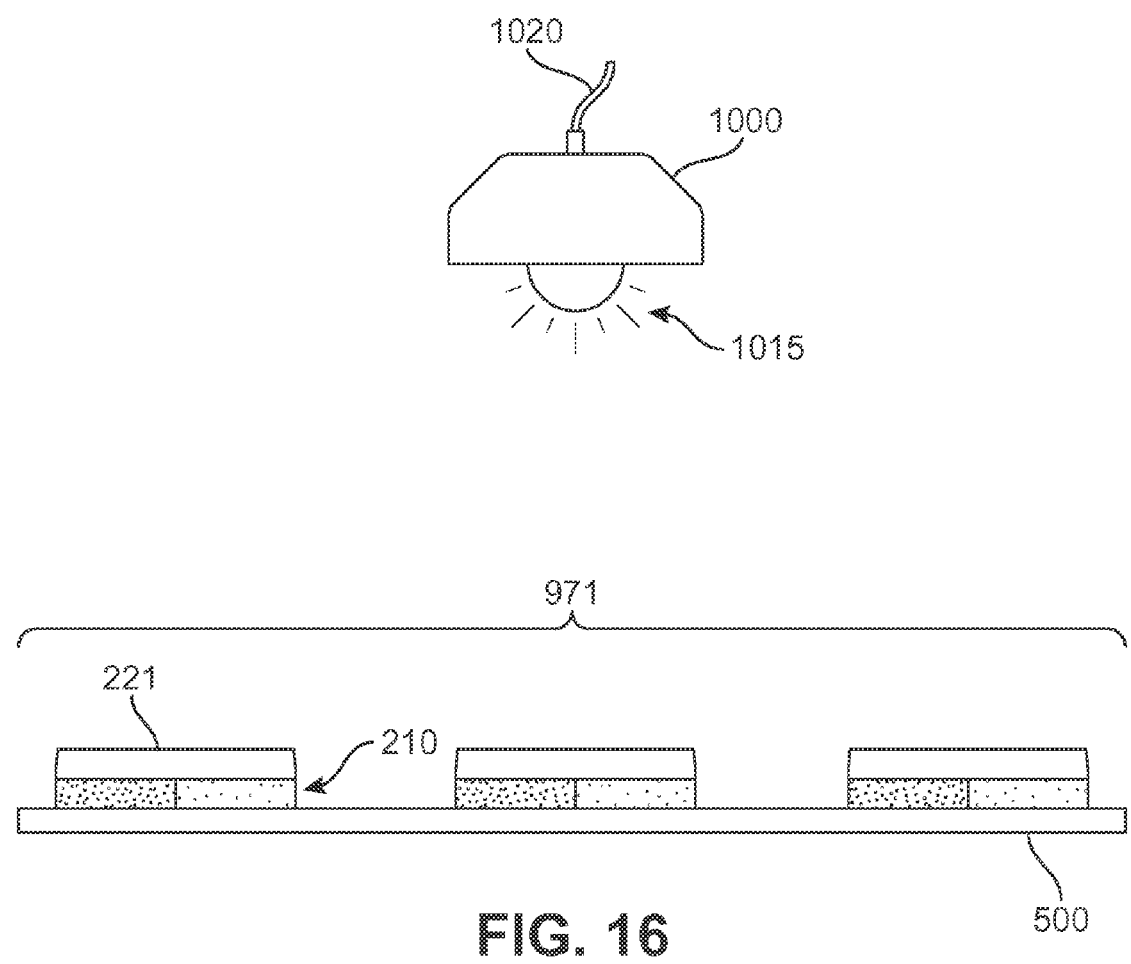
FIG. 16 is an embodiment of radiation source curing a first lens layer.

As shown in FIGS. 15 and 16, after discrete coloring elements 970 are cured, print head 910 prints first lens layers 971 on the top portions of discrete coloring elements 970. That is, each discrete coloring element of the plurality of discrete coloring elements 970 is covered with a first lens layer from the plurality of first lens layers 971. For example, first lens layer 221 may be printed onto discrete coloring element 210.

Generally, each lens layer is made of transparent or translucent toner 1050. However, each lens layer could have at least some color while at least maintaining some transparent or translucent properties. In some embodiments, printing apparatus 900 may use print head 910 to print both discrete coloring elements 970 and one or more of the lens layers. In other embodiments, printing apparatus 900 may use a different print head to print the lens layers.

FIG. 16 shows an exemplary curing process for first lens layers 971. Radiation 1015 from radiation source is again used to cure first lens layers 971 (such as first lens layer 221). In some embodiments (not shown), first lens layers 971 may be cured with radiation having an intensity greater than or equal to the intensity used to cure discrete coloring elements 970 in a previous step. In the exemplary embodiment in FIG. 16, radiation source 1000 emits radiation 1015 having 5% intensity (i.e., 5% of the maximum intensity or 5% of a predetermined intensity) to cure first lens layers 971.

Radiation source 1000 may cure lens layers individually or cure several lens layers simultaneously. In some methods of printing and curing, radiation source 1000 may cure all of first lens layers 971 (printed onto discrete coloring element 970) simultaneously before printing apparatus 900 prints second lens layers 972 (see FIG. 17). In other methods of printing and curing, printing apparatus 900 may begin printing second lens layers 972 over some lens layers of first lens layers 971 that have been cured before radiation source 1000 cures remaining (uncured) first lens layers 971. It will be understood that these methods printing and curing apply to successive lens layers of the final lenticular lens structures.

Figure 17:
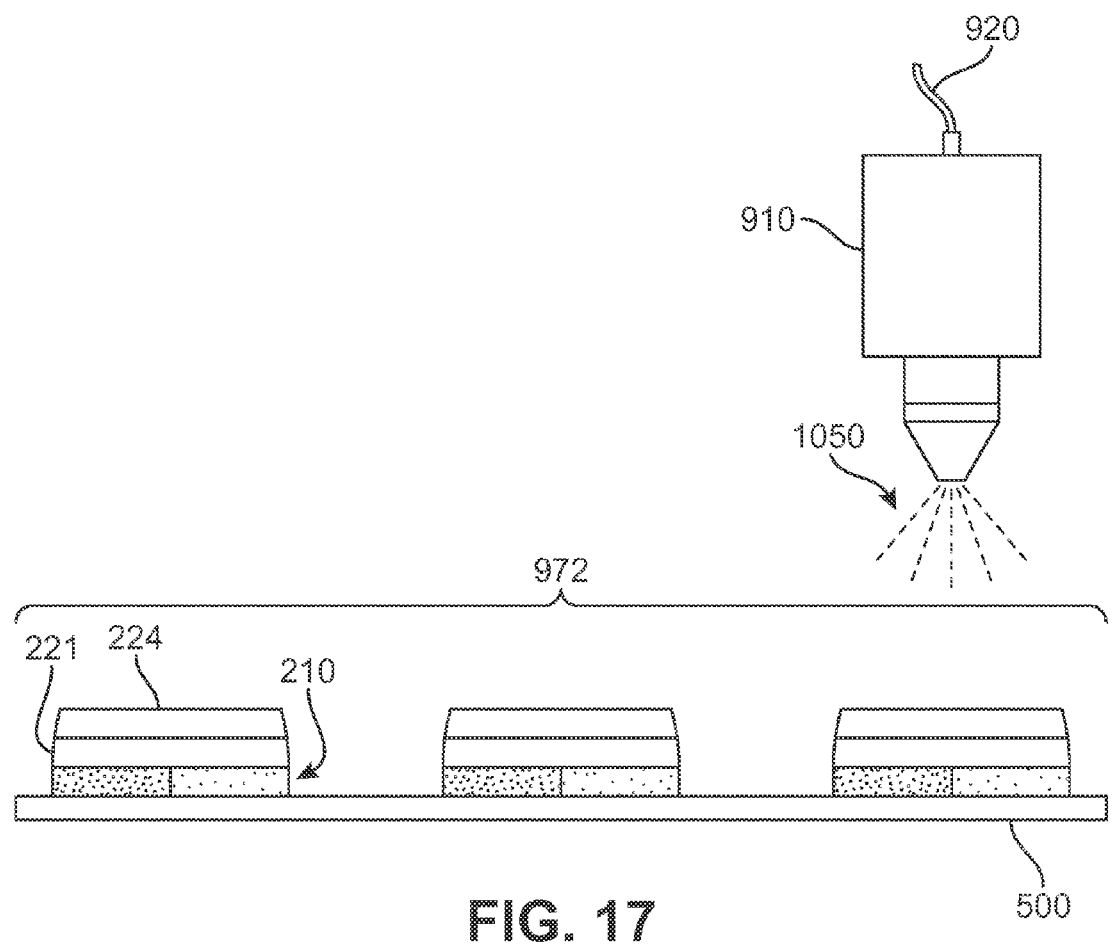
FIG. 17 illustrates an embodiment of a print head printing a second lens layer onto second lens layer.
Figure 18:
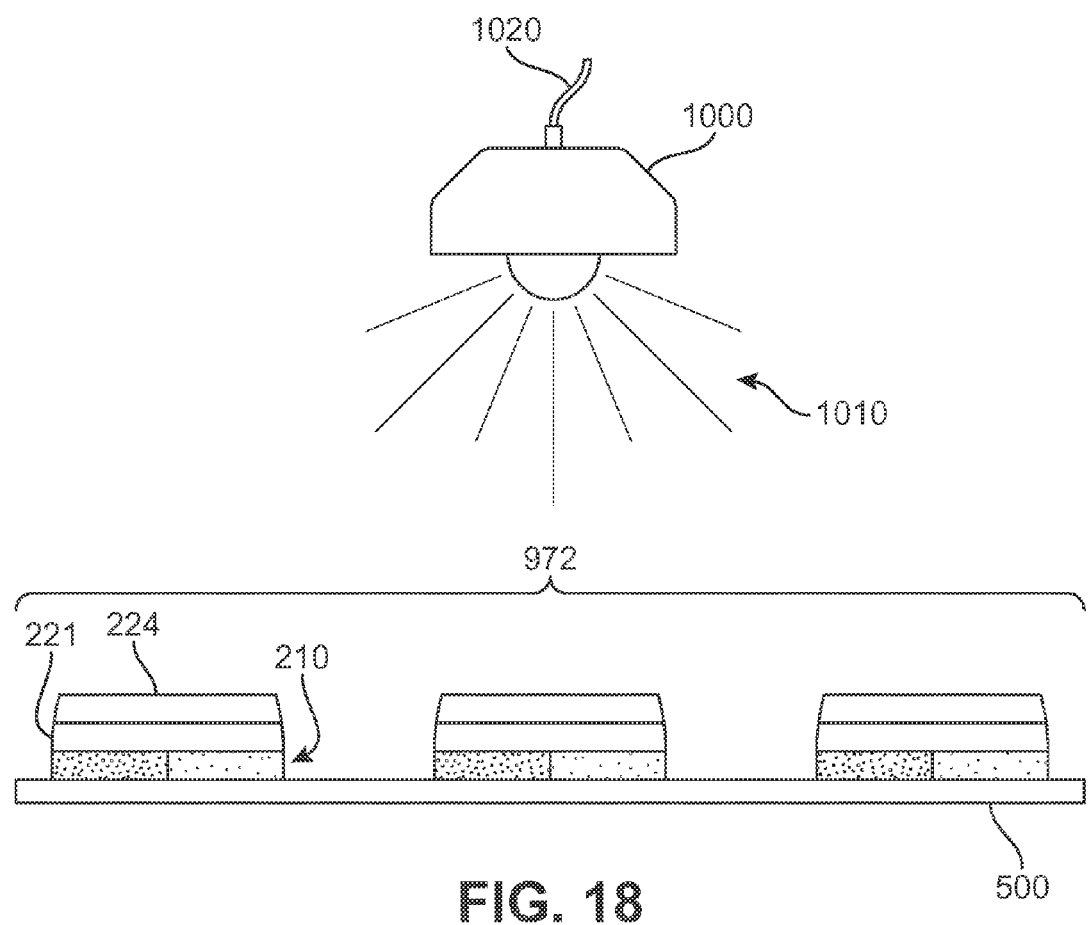
FIG. 18 is an embodiment of radiation source curing a second lens layer.

FIGS. 17 and 18 illustrate a side schematic view of the printing and curing of a plurality of second lens layers 972 of the lenticular lens structures. In FIG. 17, print head 910 prints second lens layers 972 over top surface (not shown) of first lens layers 971. In some embodiments (not shown), second lens layers 972 may have similar size and shape as first lens layers 971. In the exemplary embodiment shown in FIGS. 17 and 18, second lens layers 972 are smaller than first lens layers 971 and are also arched at the outer surfaces of first lens layers 971.

Collectively, printing apparatus 900 may print lens layers such that first lens layers 971, second lens layers 972, and successive lens layer form a dome like structure. However, it should be noted that in other embodiments, printing apparatus 900 may print lens layers such that the resulting lenticular lens structures resemble a parallelogram, a cube, a semi-cylindrical shape, a semi-spherical shape, or a semi-ellipsoid shape. Moreover, in some other embodiments, different lenticular lens structures could be formed to have substantially different geometries from one another.

FIG. 18 shows the curing process for second lens layers 972. In some embodiments (not shown), second lens layers 972 may be cured with radiation having an intensity less than or equal to the intensity used to cure first lens layers 971. In the exemplary embodiment in FIG. 19, radiation source 100 emits radiation 1010 having 100% intensity (e.g., the predetermined maximum intensity level) to cure second lens layers 972.

Figure 19:
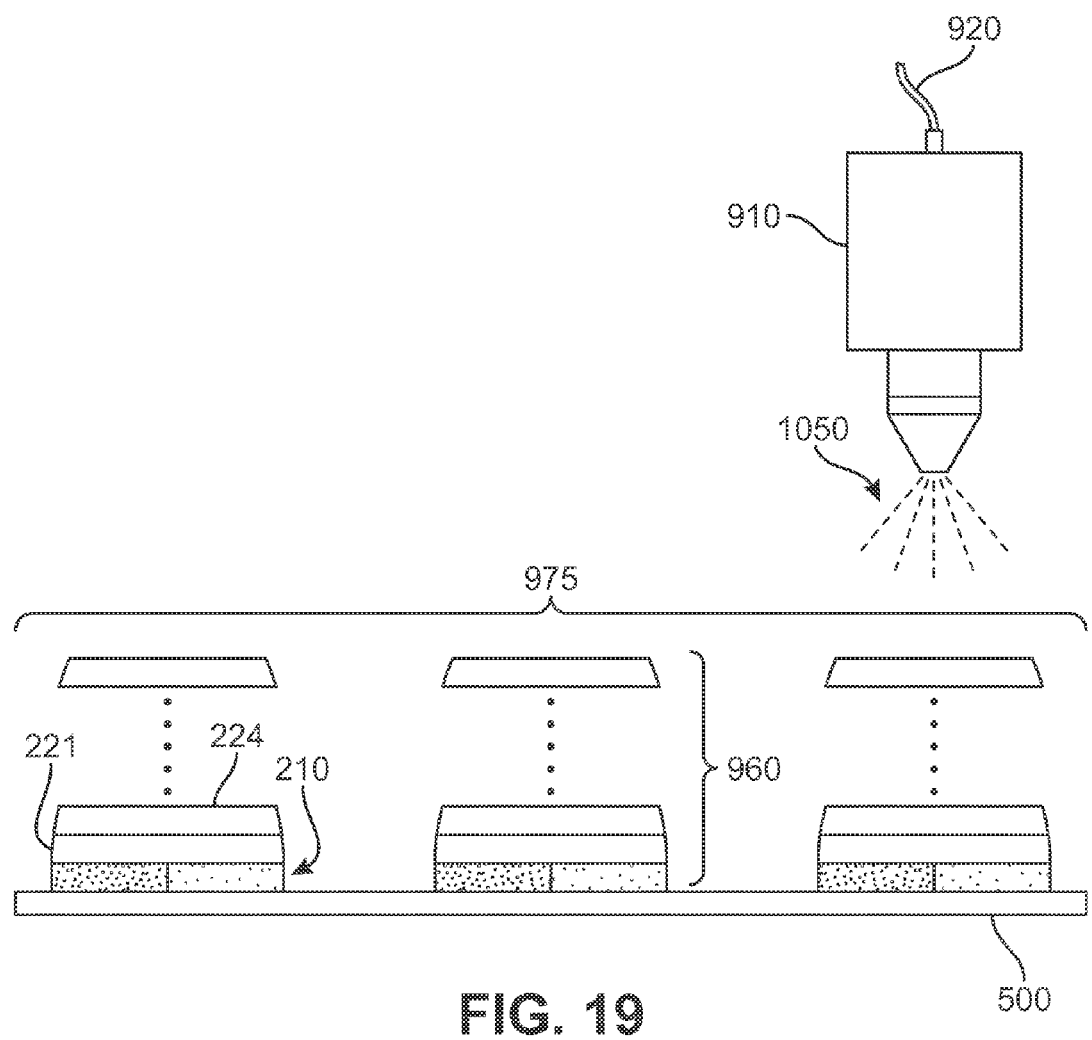
FIG. 19 is an embodiment of a print head printing multiple lens layers.

FIG. 19 illustrates a side view of print head 910 and the formation of "n" additional lens layers 975 of the lenticular lens structures 960. Although exemplary embodiments shown in FIGS. 7-9 show lenticular lens structures 960 having five lens layers, printing apparatus 900 is capable of printing more than five lens layers. Moreover, radiation source (not shown) is capable of curing lenticular lens structures 960 having more than five lens layers (for example, "n" layers 975) at any intensity previously disclosed in this detailed description.

Figure 20:
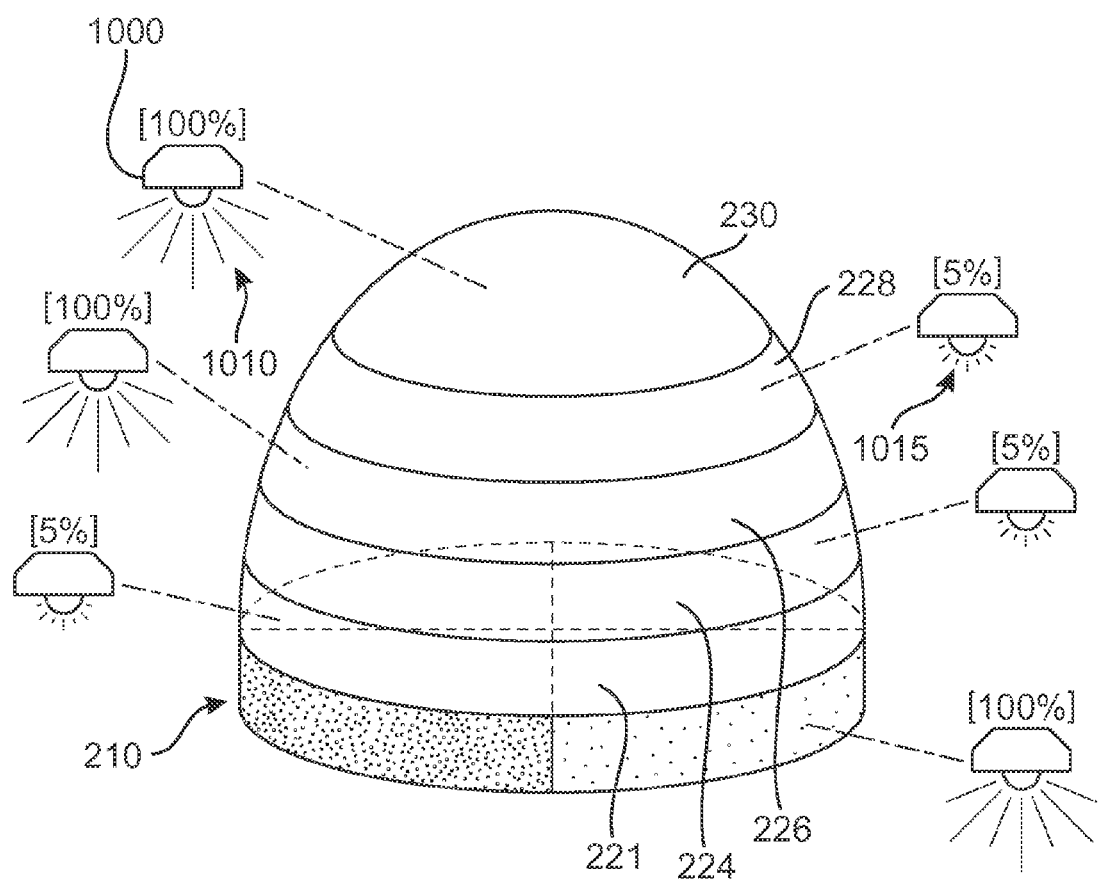
FIG. 20 is an isometric view of an embodiment of an optical structure having gone through a full printing and curing process.

FIG. 20 is an exemplary embodiment of optical structure 200 with both the discrete coloring element 210 and all lens layers of lenticular lens structure 220 having undergone a curing process from radiation source 1000. In this exemplary embodiment, discrete coloring element 210 is cured at 100% intensity, first lens layer 221 is cured at 5% intensity, second lens layer 224 is cured at 5% intensity, third lens layer 226 is cured at 100% intensity, fourth lens layer 228 is cured at 5% intensity, and fifth lens layer 230 is cured at 100% intensity. As stated earlier, in other embodiments, radiation intensity could vary for the discrete coloring element 210 as well as any of the lens layers of lenticular lens structure 220. In particular, the radiation intensity used to cure each lens layer can be selected to achieve desired optical effects, including desired indices of refraction for each layer to form a desired lenticular lens configuration.

Figure 22:
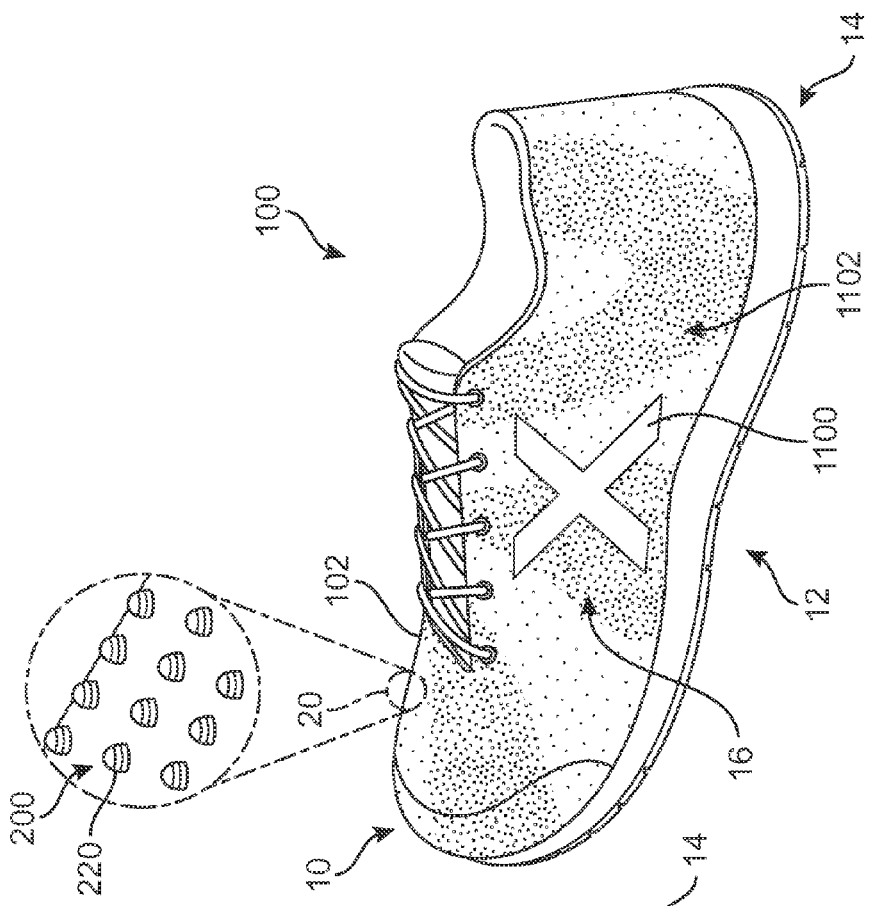
FIGS. 21 and 22 are isometric views of an article of footwear shown at different viewing angles, with FIG. 22 having an appearance of indicia on the article of footwear.
Figure 21:
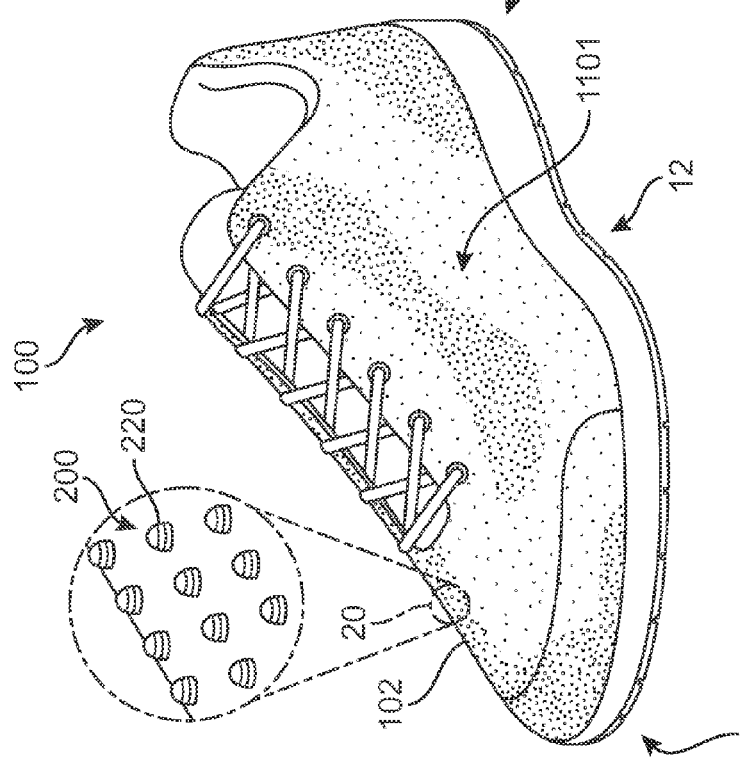

FIGS. 21 and 22 illustrate an embodiment of an article of footwear 100 shown at two different viewpoints, and having several optical structures 200 on forefoot 10, midfoot 12, and heel portion 14. In additional to an upper 102 having a difference appearance, in terms of color schemes, from different viewing angles, some embodiments of article 100 have optical structures 200 configured such that upper 102, when viewed from at least one viewpoint, has an appearance displaying an indicia. The term "indicia" as used throughout this detailed description and in the claims refers to letters, numbers, symbols and/or logos. For example in FIG. 21, optical structures 200 may be configured on upper 102 to give a first appearance 1101 of upper 102, as shown in FIG. 21. However, when viewed from second viewpoint, shown in FIG. 22 with heel portion 14 in the forefront, the same article of footwear 100 has an upper 102 not only with second appearance 1102 different from first appearance 1101 (in terms of color scheme), but second appearance 1102 also displays a logo 1100 on lateral side 16 of upper 102. It will be understood that indicia, such as a logo 1100 in FIG. 22, is only intended for purposes of description and is not intended to demarcate a precise logo at a precise location. Indicia could be displayed at a given viewpoint or viewpoints anywhere on the upper 102, including forefoot portion 10, midfoot portion 12, and/or heel portion 14. Also, indicia could be displayed on the lateral side 16 and/or medial side 18 of upper 102.

Figure 23:
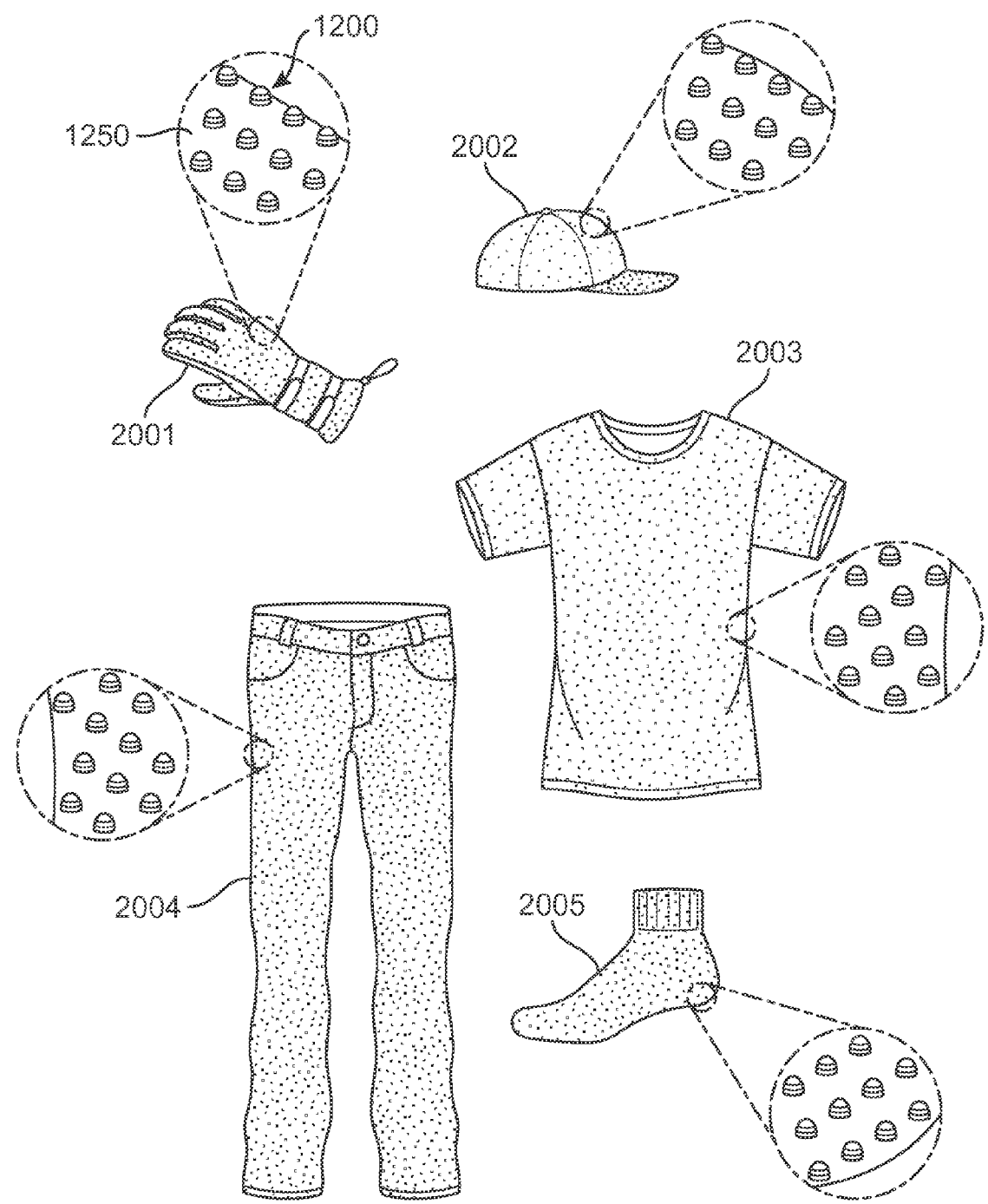
FIG. 23 illustrates an embodiment of several articles of apparel, each having a plurality of optical structures.

FIG. 23 illustrates several articles of apparel having base material elements with a plurality of optical structures. For example, glove 2001 is seen to be comprised of a base material element 1250 with a plurality of optical structures 1200. Optical structures 1200 on base material element 1250 are configured in a manner described above for article of footwear 100. This includes, for example, coloring schemes, appearances, indicia, and placement of optical structures on base material element. This also includes size, shape, and geometry of optical structure and its elements.

In a similar manner, optical structures can be arranged on various other articles of clothing or apparel such as 2002, shirt 2003, pants 2004, sock 2005. Additional articles include, but are not limited to: stocking caps, jackets as well as bags, purses or other kinds of articles.

The description provided above is intended to illustrate some possible combinations of various features associated with an article of footwear and other apparel. Those skilled in the art will understand, however, that within each embodiment, some features may be optional. Moreover, different features discussed in different embodiments could be combined in still other embodiments and would still fall within the scope of the attached claims. Some features could be used independently in some embodiments, while still other features could be combined in various different ways in still other embodiments.

While various embodiments have been described, the description is intended to be exemplary, rather than limiting and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims.

What is claimed is:

1. An article configured to be worn by a user, comprising:
    a base material element;
    a plurality of optical structures, wherein each optical structure is further comprised of:
        a discrete coloring element, wherein the discrete coloring element has a first side disposed against the base material element and a second side disposed opposite of the first side, and wherein each discrete coloring element includes at least two regions having different colors;
        a lenticular lens structure, the lenticular lens structure having a plurality of lens layers and wherein a bottom most lens layer of the lenticular lens structure is disposed against the second side of the discrete coloring element, and wherein a bottom surface of the bottom most lens layer of the lenticular lens structure is coextensive with the second side of the discrete coloring element;
    wherein the plurality of optical structures are spaced apart from one another; and
    wherein the apparent color of the plurality of optical structures changes when the article is viewed from different angles.

2. The article according to claim 1, wherein:
    the plurality of lens layers of the lenticular lens structure are transparent or translucent;
    the discrete coloring element comprises a first region, a second region, a third region, and a fourth region; and
    wherein the first region has a first color, the second region has a second color, the third region has a third color, and the fourth region has a fourth color, wherein each color is different from the other colors.

3. The article according to claim 1, wherein a first lens layer of the plurality of lens layers has a different index of refraction from a second lens layer of the plurality of lens layers.

4. The article according to claim 1, wherein:
    the plurality of lens layers of the lenticular lens structure comprises a first lens layer, a second lens layer, a third lens layer, a fourth lens layer, and a fifth lens layer; and
    wherein the lenticular lens structure has a dome-like geometry.

5. The article according to claim 1, wherein the article includes a plurality of optical structures, wherein the plurality of optical structures are arranged on the article so that the article has a first appearance when viewed from a first viewing angle and a second appearance when viewed from a second viewing angle.

6. The article according to claim 1, wherein the article is an article of footwear.

7. The article according to claim 6, wherein the base material element is associated with an upper of the article of footwear.

8. The article according to claim 1, wherein the article is an article of clothing.

9. The article according to claim 1, wherein the plurality of optical structures comprises a first optical structure having a first discrete coloring element and a second optical structure having a second discrete coloring element, and wherein the first discrete coloring element is spaced apart from the second discrete coloring element, and wherein the base material element is exposed on an exterior surface of the article in the space between the first discrete coloring element and the second discrete coloring element.

10. An article having a base material element with at least one optical structure, the at least one optical structure further comprising:
    a discrete coloring element having a circular shape and an element diameter, the discrete coloring element further having a first side and a second side opposite the first side, the discrete coloring element further having a plurality of colors;
    a lenticular lens structure, the lenticular lens structure having a plurality of lens layers and wherein a bottom most lens layer of the lenticular lens structure is disposed against the second side of the discrete coloring element, wherein the bottom most lens layer has a layer diameter, wherein the layer diameter is the same as the element diameter;
    wherein the lenticular lens structure is substantially transparent;

wherein the discrete coloring element is comprised of a first region, a second region, a third region and a fourth region;

wherein the first region has a first color, the second region has a second color, the third region has a third color and the fourth region has a fourth color;

wherein the first color, the second color, the third color and the fourth color are each different; and wherein the apparent color of the discrete coloring element changes when the discrete coloring element is viewed from different angles through the lenticular lens structure.

11. The article according to claim 10, wherein:

the plurality of lens layers includes at least a first lens layer and a second lens layer, wherein the first lens layer is formed by printing the first lens layer onto the discrete coloring element and curing the first lens layer using a first intensity of ultraviolet radiation;

wherein the second lens layer is formed by printing the second lens layer onto the first lens layer and curing the second lens layer using a second intensity of ultraviolet radiation; and wherein the first intensity is less than the second intensity.

12. The article according to claim 11, wherein the first lens layer has a different index of refraction than the second lens layer.

13. The article according to claim 10, wherein the lenticular lens structure comprises five lens layers, wherein the optical structure is formed by: curing the discrete coloring element using an ultraviolet radiation source set to a predetermined intensity;

curing two of the lens layers using the ultraviolet radiation source set to the predetermined intensity; and curing three of the lens layers using the ultraviolet radiation source set to five percent of the predetermined intensity.

14. The article according to claim 13, wherein at least two of the lens layers cured at five percent of the predetermined intensity are in contact with one another.

15. The article according to claim 13, wherein at least two of the lens layers cured at five percent of the predetermined intensity are separated by at least one layer cured at the predetermined intensity.

16. The article according to claim 15, wherein:

the discrete coloring element has a first appearance when observed through the lenticular lens structure, the first appearance being substantially free of the first color, the third color, and the fourth color;

the discrete coloring element has a second appearance when viewed through the lenticular lens structure, the second appearance comprising the first color, the third color, and the fourth color, wherein the first color, the third color, and the fourth color are observed in substantially identical proportions; and wherein the discrete coloring element has a third appearance when observed through the lenticular lens structure, the third appearance being substantially free of the first color and the second color.

17. The article according to claim 10, wherein the article includes a plurality of optical structures, wherein the plurality of optical structures are arranged on the article so that the article has a first appearance when viewed from a first viewing angle and a second appearance when viewed from a second viewing angle.

18. A method of printing an optical structure onto a base material element of an article, comprising:

printing a discrete coloring element on the base material element;

printing a bottom lens layer onto the discrete coloring element so that the bottom lens layer and the discrete coloring element are coextensive;

curing the bottom lens layer by applying a radiation source set to a first intensity to the bottom lens layer;

printing an intermediate lens layer;

curing the intermediate lens layer by applying the radiation source set to a second intensity to the intermediate lens layer; and wherein the first intensity is different than the second intensity.

19. The method of printing according to claim 18, wherein the method includes printing five lens layers and wherein the method further includes curing three lens layers at the second intensity and wherein the method further includes curing two lens layers at the first intensity and wherein the first intensity less than the second intensity.

20. The method of printing according to claim 18, wherein a plurality of optical structures are printed onto the article, wherein the plurality of optical structures are arranged on the article so that the article has a first appearance when viewed from a first viewing angle and a different appearance when viewed from a different viewing angle.

* * * * *